US009811873B2

(12) United States Patent
Lee et al.

(10) Patent No.: US 9,811,873 B2
(45) Date of Patent: Nov. 7, 2017

(54) SCALER CIRCUIT FOR GENERATING VARIOUS RESOLUTION IMAGES FROM SINGLE IMAGE AND DEVICES INCLUDING THE SAME

(71) Applicant: SAMSUNG ELECTRONICS CO., LTD., Suwon-si (KR)

(72) Inventors: Sung Rae Lee, Seoul (KR); Seung Hun Jeong, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/007,674

(22) Filed: Jan. 27, 2016

(65) Prior Publication Data

US 2016/0239941 A1 Aug. 18, 2016

(30) Foreign Application Priority Data

Feb. 12, 2015 (KR) ........................ 10-2015-0021800

(51) Int. Cl.
*G06K 9/32* (2006.01)
*G06T 1/20* (2006.01)

(52) U.S. Cl.
CPC ...................................... *G06T 1/20* (2013.01)

(58) Field of Classification Search
CPC ....... G06T 3/40; G06T 3/4092; G06T 3/4007; G06T 3/4023; G06T 1/20; G06T 1/60; H04N 1/3935; H04N 1/393
See application file for complete search history.

(56) References Cited

U.S. PATENT DOCUMENTS

| | | | |
|---|---|---|---|
| 7,667,718 B2 | 2/2010 | Hsu et al. | |
| 8,570,443 B2 | 10/2013 | Lin et al. | |
| 8,682,101 B1 | 3/2014 | Sahu et al. | |
| 8,687,922 B2 | 4/2014 | Tripathi et al. | |
| 8,711,180 B2 | 4/2014 | Kim | |
| 8,773,469 B2 | 7/2014 | Komorowski et al. | |
| 8,804,040 B2 | 8/2014 | Garg et al. | |
| 2008/0266305 A1* | 10/2008 | Cheng ........................ | G06T 1/60 345/545 |
| 2009/0135310 A1* | 5/2009 | Kim ...................... | G09G 3/3666 348/739 |
| 2010/0110086 A1* | 5/2010 | Yun ...................... | H04N 7/0132 345/520 |
| 2011/0102465 A1 | 5/2011 | Cho et al. | |
| 2014/0026100 A1* | 1/2014 | So ...................... | H04N 5/44513 715/825 |

(Continued)

FOREIGN PATENT DOCUMENTS

| | | |
|---|---|---|
| JP | 2007193397 A | 8/2007 |
| KR | 1020080076053 A | 8/2008 |

*Primary Examiner* — Amir Alavi
(74) *Attorney, Agent, or Firm* — Sughrue Mion, PLLC

(57) ABSTRACT

A scaler circuit is provided. The scaler circuit includes a first scaler configured to perform a first horizontal scaling operation after a first vertical scaling operation, a second scaler configured to perform a second horizontal scaling operation after a second vertical scaling operation and a line memory which is shared by the first scaler and the second scaler. Each of the first scaler and the second scaler generates a first image and a second image, respectively, having different resolutions from a single image using the line memory.

20 Claims, 14 Drawing Sheets

(56) References Cited

U.S. PATENT DOCUMENTS

2014/0098289 A1*  4/2014  Jang .................... G11B 27/105
                                              348/441
2016/0098812 A1*  4/2016  Yoon .................... G06T 3/4092
                                              345/505
2016/0239941 A1*  8/2016  Lee ......................... G06T 1/20

* cited by examiner

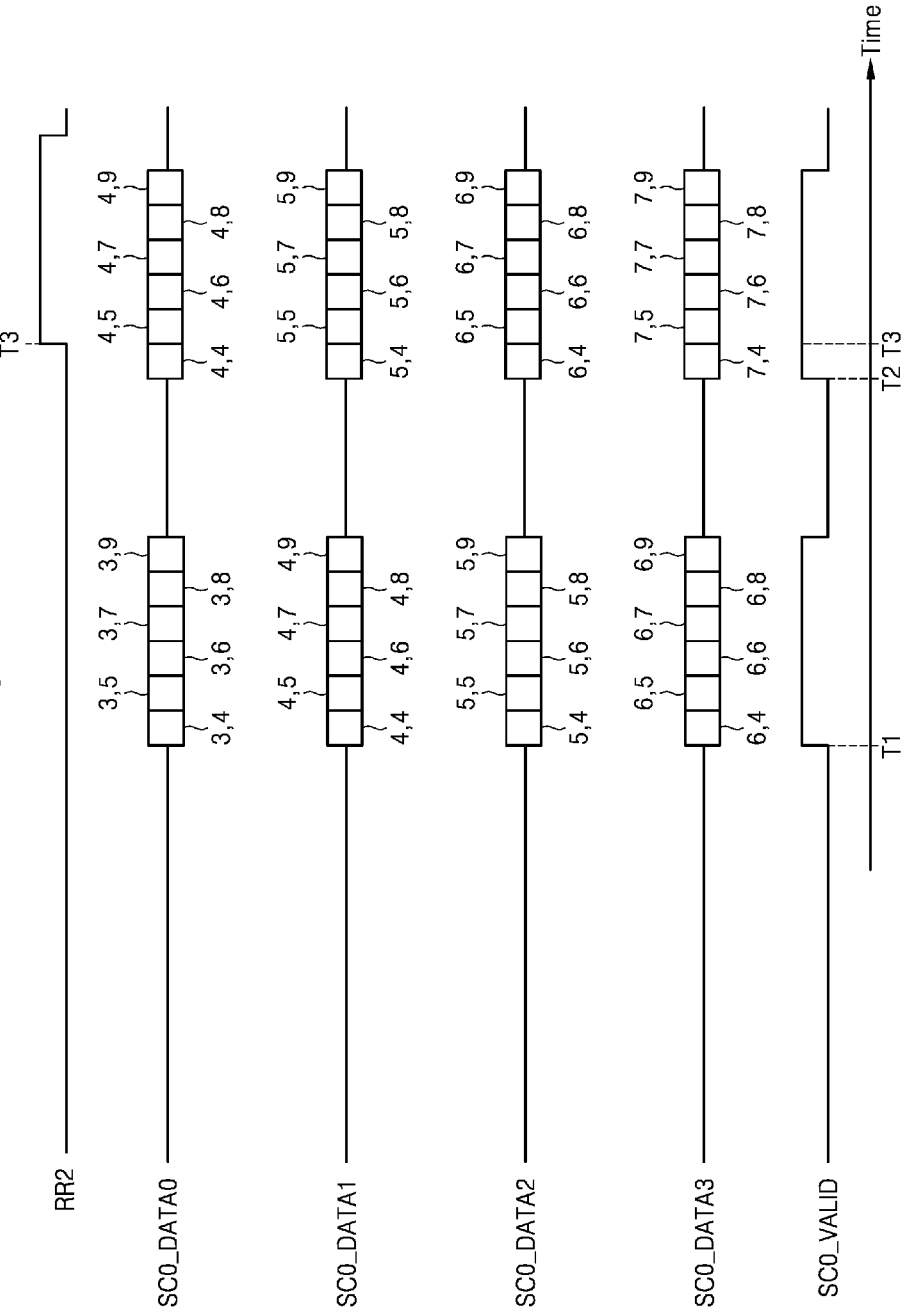

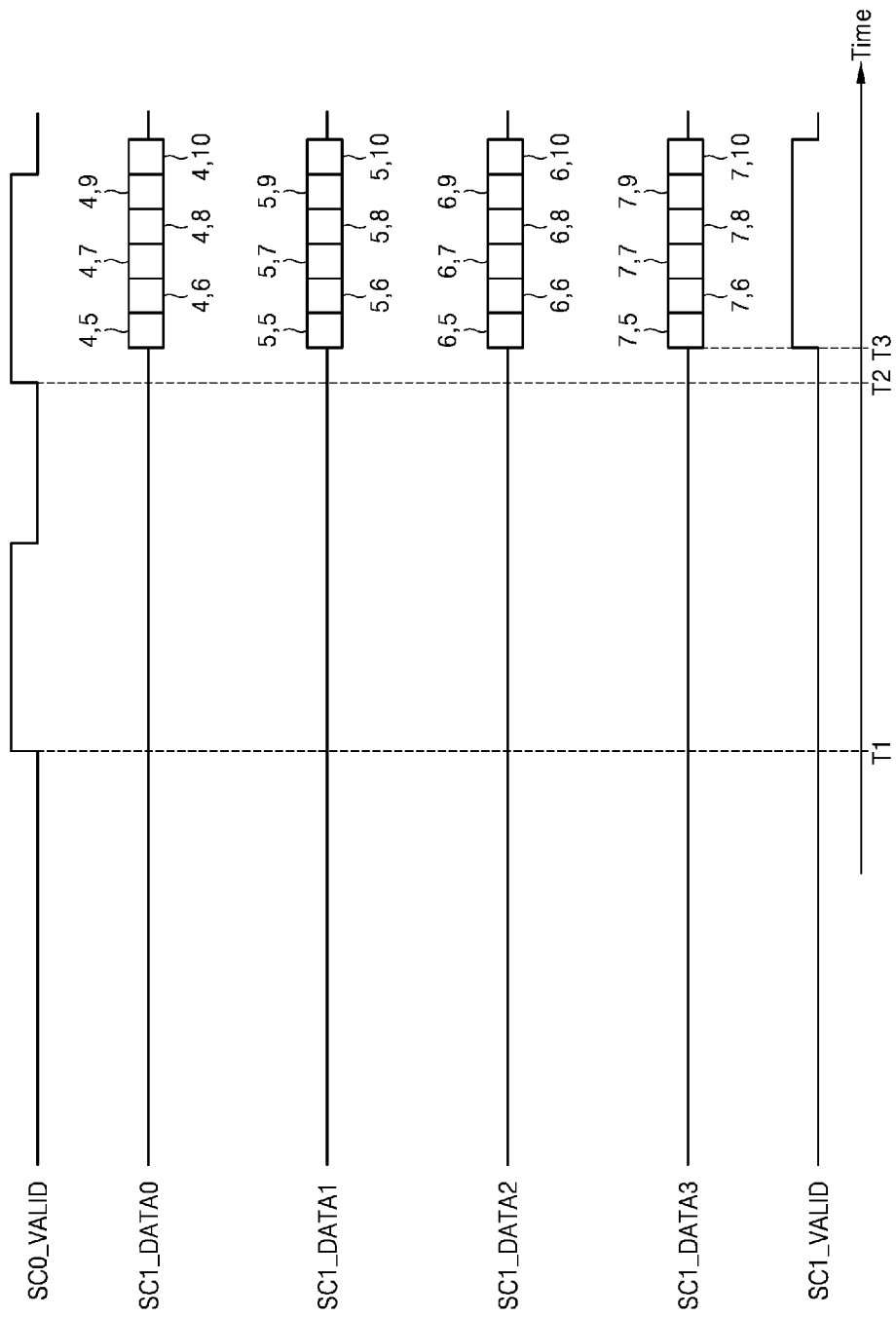

Scale-Up

Scale-Down

SCALER CIRCUIT FOR GENERATING VARIOUS RESOLUTION IMAGES FROM SINGLE IMAGE AND DEVICES INCLUDING THE SAME

CROSS-REFERENCE TO RELATED APPLICATION

This application claims priority under 35 U.S.C. §119(a) from Korean Patent Application No. 10-2015-0021800 filed on Feb. 12, 2015, the disclosure of which is hereby incorporated by reference in its entirety.

BACKGROUND

One or more exemplary embodiments relate to a scaler circuit, and more particularly to a scaler circuit which can generate images having different scaling ratios from a single image in a parallel manner, and devices having the same.

An image scaler may be a circuit which can scale-up (or up-scale) or scale-down (down-scale) an image or image data, or software which can perform an algorithm to up-scale or down-scale an image. For example, an image processing application (or application program) may resize a single image into a plurality of images for various purposes such as previews, recording, capture, and thumbnails.

When generating a plurality of resized images from the single input image using an image scaler which generates a single output image from the single input image, the image scaler needs to generate the plurality of resized images by reading the same image stored in a memory a plurality of times. In order to generate the plurality of resized images from the single input image within given time, a frequency of a clock signal supplied to the image scaler needs to be high. Accordingly, an image scaler which uses a clock signal having a high frequency causes an increase in the amount of power consumed by the image scaler and an image processing system having the same.

SUMMARY

According to an aspect of an exemplary embodiment a scaler circuit is provided. The scaler circuit includes a first scaler which performs a first horizontal scaling operation after a first vertical scaling operation, a second scaler which performs a second horizontal scaling operation after a second vertical scaling operation, and a line memory which is shared by the first scaler and the second scaler, in which each of the first scaler and the second scaler generates a first image and a second image, respectively, having different resolutions from a single image using the line memory. The scaler circuit further includes a line memory controller which transmits position information on each of pixels included in the single image to the first scaler and the second scaler.

The first scaler selects first pixels related to the first image to be stored in the line memory among the pixels using the position information on each of the pixels, and the second scaler selects second pixels related to the second image to be stored in the line memory among the pixels using the position information on each of the pixels.

The first scaler determines first read timings for the first pixels stored in the line memory using the position information on each of the pixels, and the second scaler determines second read timings for the second pixels stored in the line memory using the position information on each of the pixels.

The line memory controller stores the first pixels in the line memory and reads the first pixels stored in the line memory according to the first read timings, according to a control of the first scaler, and stores the second pixels in the line memory and reads the second pixels stored in the line memory according to the second read timings, according to a control of the second scaler.

The first scaler includes a first vertical scaler which vertically scales the first pixels transmitted from the line memory controller, and a first horizontal scaler which horizontally scales pixels output from the first vertical scaler to generate the first image. The second scaler includes a second vertical scaler which vertically scales the second pixels transmitted from the line memory controller and a second horizontal scaler which horizontally scales pixels output from the second vertical scaler to generate the second image.

The scaler circuit further includes a first post-scaler which scales-down the first image generated by the first scaler and a second post-scaler which scales-down the second image generated by the second scaler.

The scaler circuit further includes a line memory controller which stores first pixels related to the first image among the pixels in the line memory and reads the first pixels stored in the line memory according to a control of the first scaler, and stores second pixels related to the second image among the pixels in the line memory and reads the second pixels stored in the line memory according to a control of the second scaler.

The scaler circuit further includes a FIFO controller, a line buffer which is accessed by the FIFO controller or the line memory controller, and a selector which provides an input image of the FIFO controller or an output image of the FIFO controller as the single image.

When the first image and the second image are scaled-down images, and the single image is the output image of the FIFO controller, each of the first scaler and the second scaler generates the first image and the second image, respectively, using the line memory. When the first image and the second image are scaled-up images, and the single image is the input image of the FIFO controller, each of the first scaler and the second scaler generates the first image and the second image, respectively, using the line memory and the line buffer.

According to an aspect of another exemplary embodiment, an application processor is provided. The application processor includes a bus, and a scaler circuit connected to the bus, in which the scaler circuit includes a first scaler which performs a horizontal scaling operation after a vertical scaling operation, a second scaler which performs a horizontal scaling operation after a vertical scaling operation, and a line memory which is shared by the first scaler and the second scaler. Each of the first scaler and the second scaler generates a first image and a second image, respectively, having different resolutions from a single image using the line memory.

According to an aspect of another exemplary embodiment, a mobile computing device is provided. The mobile computing device includes an image sensor, an external memory, and an application processor which is connected to the image sensor and the external memory, in which the application processor includes a bus and a scaler circuit connected to the bus. The scaler circuit includes a first scaler which performs a horizontal scaling operation after a vertical scaling operation, a second scaler which performs a horizontal scaling operation after a vertical scaling operation, and a line memory which is shared by the first scaler and the second scaler. Each of the first scaler and the second scaler generates a first image and a second image, respectively, having different resolutions from a single image using the line memory.

The mobile computing device further includes a line memory controller which transmits position information on each of pixels included in the single image to the first scaler and the second scaler, the first scaler selects first pixels related to the first image to be stored in the line memory among the pixels using the position information of each of the pixels, and the second scaler selects second pixels related to the second image to be stored in the line memory among the pixels using the position information on each of the pixels.

According to an aspect of an exemplary embodiment a scaler circuit is provided. The scaler circuit includes a line memory configured to store a single image, a first scaler configured to read the single image from the line memory and to generate a first image by performing a first horizontal scaling operation and a first vertical scaling operation on the single image, and a second scaler configured to read the single image from the line memory and to generate a second image by performing a second horizontal scaling operation and a second vertical scaling operation on the single image. The first image and the second image have different resolutions from the single image.

BRIEF DESCRIPTION OF THE DRAWINGS

These and/or other aspects and advantages of the exemplary embodiments will become apparent and more readily appreciated from the following description of the exemplary embodiments, taken in conjunction with the accompanying drawings of which:

FIGS. 7A to 7C are conceptual diagrams which describe a process of processing a first region and a second region included in the original image shown in FIG. 6;

DETAILED DESCRIPTION OF THE EXEMPLARY EMBODIMENTS

Figure 1:
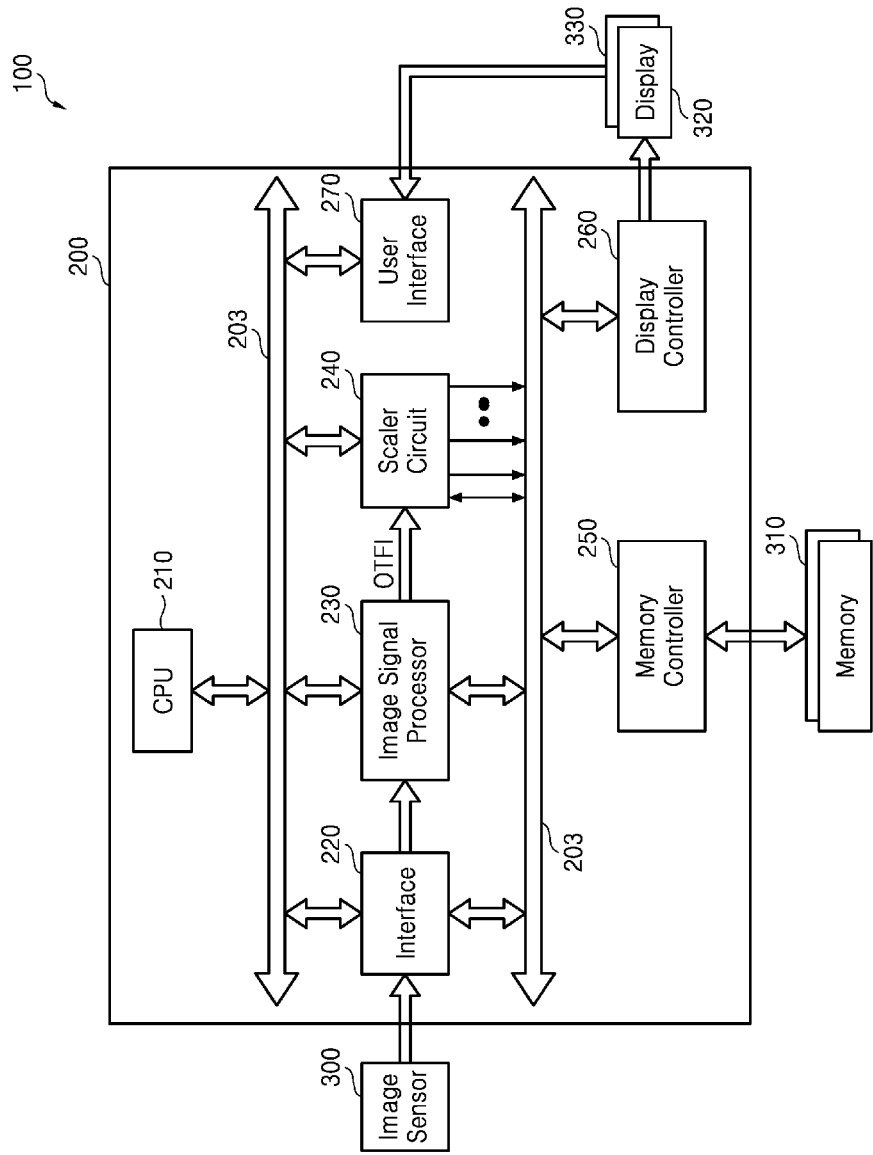
FIG. 1 is a block diagram of a data processing system according to an exemplary embodiment.

Reference will now be made in detail to the exemplary embodiments, which are illustrated in the accompanying drawings, wherein like reference numerals refer to the like elements throughout. The exemplary embodiments are described below in order to explain the present general inventive concept by referring to the figures.

FIG. 1 is a block diagram of a data processing system according to an exemplary embodiment. Referring to FIG. 1, a data processing system 100 may include a data processing device 200, an image sensor 300, a memory 310, a display 320, and a user input device 330. Each of the image sensor 300 and the memory 310 may perform a function of an image source. The data processing system 100 may be embodied in a personal computer (PC) or a mobile computing device. The mobile computing device may be embodied in a laptop computer, a mobile phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an internet of things (IoT) device, an internet of everything (IoE) device, a drone, or an e-book.

The data processing device 200 may include a CPU 210, a bus architecture or bus 203, an interface 220, an image signal processor 230, a scaler circuit 240, a memory controller 250, a display controller 260, and a user interface (or user input interface) 270. The data processing device 200 may be embodied in an integrated circuit (IC), a motherboard, a system on chip, an application processor (AP), or a mobile AP; however, it is not limited thereto.

The data processing device 200 may scale images having different scaling ratios, images having different resolutions, or re-sized images from a single input image at the same time or in a parallel manner, and generate the scaled images.

The CPU 210 may generally control an operation of the data processing device 200. The CPU 210 may control an operation of the image signal processor 230, an operation of the scaler circuit 240, and/or an operation of the memory controller 250 in response to a scale-up signal, a scale-down signal, or a detection signal indicating a rotation, which are transmitted from the user interface 270. For example, the scaler circuit 240 may be embodied in the image signal processor 230.

The CPU 210, the interface 220, the image signal processor 230, the scaler circuit 240, the memory controller 250, and the display controller 260, and the user interface 270 may transmit or receive a command and/or data to or from each other through the bus architecture 203.

The bus architecture 203 may be embodied in a bus using an Advanced Microcontroller Bus Architecture (AMBA) protocol, a bus using an Advanced High-performance Bus (AHB) protocol, a bus using an Advanced Peripheral Bus (APB) protocol, or a bus using an AMBA Extensible Interconnect (AXI) protocol; however, the bus architecture 203 is not limited thereto. The bus architecture 203 shown in FIG. 1 is exemplarily shown, and the bus architecture 203 according to an exemplary embodiment is not limited thereto.

The interface 220 may receive a pixel output from the image sensor 300, e.g., pixel having a Bayer pattern, and transmit the received pixels to the image signal processor 230. For example, the pixel may be RGB data.

When the image sensor 300 is embodied in a camera module, the interface 220 may be embodied in a camera interface. According to an exemplary embodiment, the image sensor 300 may be embodied in a CMOS image sensor; however, it is not limited thereto. According to an exemplary embodiment, pixels generated by the image sensor 300 may be transmitted to the interface 220 through a Mobile Industry Processor Interface (MIPI) camera serial interface (CSI).

The image signal processor 230 may convert a first data format of pixels output from the image sensor 300 into a second data format. For example, the first data format may be a Bayer pattern (or RGB data), and the second data format may be YUV data (or YCbCr); however, it is not limited thereto.

When pixels included in an image (or image data) to be processed by the scaler circuit 240 is scaled-up (or up-sampled), the image signal processor 230 may transmit pixels output from the interface 220 to the memory controller 250 through the bus architecture 203 according to a control of the CPU 210.

The memory controller 250 may store pixels, e.g., image, output from the image signal processor 230 in the memory 310. The pixels, e.g., image, stored in the memory 310 may be transmitted to the scaler circuit 240 through the bus architecture 203. The image stored in the memory 310 is read once. The scaler circuit 240 may scale images having different scaling ratios, images having different resolutions, and re-sized images at the same time or in a parallel manner using the image which is read once, and generate the scaled images. For example, frame data may include the pixels.

For example, when pixels included in an image to be processed by the scaler circuit 240 are scaled-up, the scaler circuit 240 may generate a stall indication signal, and transmit the generated stall indication signal to the image signal processor 230. Accordingly, the image signal processor 230 may stall pixels transmitted to the scaler circuit 240 or transmit the pixels to the memory controller 250 through the bus architecture 203 in response to the stall indication signal.

However, when the pixels included in an image (or image data) to be processed by the scaler circuit 240 is scaled-down, the image signal processor 230 may transmit pixels output from the interface 220 to the scaler circuit 240 according to a control of the CPU 210. The scaler circuit 240 may scale pixels output from the image sensor 300 on-the-fly.

When a user scales-up or scales-down a corresponding image through the user input device 330, the user interface 270 may detect a user input which is input through the user input device 330, and transmits a detection signal to the CPU 210 through the bus architecture 203. For example, a scaling operation may be performed in units of frames.

Figure 8A:
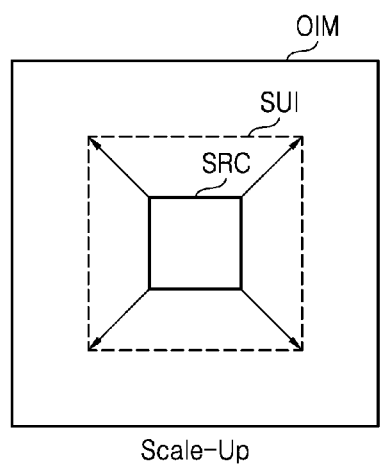
FIGS. 8A and 8B conceptually show a scale-up and a scale-down.

For example, as shown in FIG. 8A, when a user scales-up or expands a first image region SRC included in an original image OIM displayed on the display 320 into a second image region SUI, the user input device 330 may sense the scale-up or the expansion, and transmit a signal corresponding to a result of the sensing to the user interface 270. The user interface 270 may transmit a detection signal indicating a scale-up to the CPU 210 through the bus architecture 203 in response to the signal.

Figure 8B:
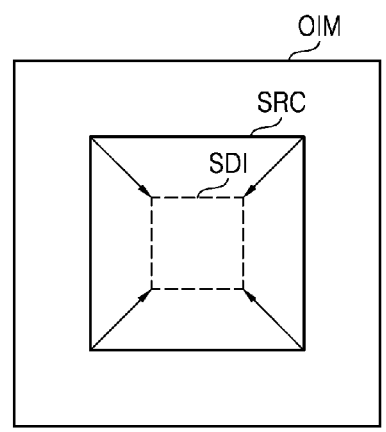

As shown in FIG. 8B, when a user scales-down or downsizes a third image region SRC included in the original image OIM displayed on the display 320 to a fourth image region SDI, the user input device 330 may sense the scale-down or the downsize, and transmit a signal corresponding to a result of the sensing to the user interface 270. The user interface 270 may transmit a detection signal indicating a scale-down to the CPU 210 through the bus architecture 203 in response to the signal.

The CPU 210 may generate a selection signal indicating a scale-up or a scale-down and transmit the selection signal to the image signal processor 230, the scaler circuit 240, and/or the memory controller 250 through the bus architecture 203, in response to a detection signal output from the user interface 270.

The scaler circuit 240 may perform a scaling operation on an image (or pixels OTFI included in the image) transmitted from the image signal processor 230 or an image (or pixels) output from the memory 310 through the bus architecture 203, according to a control of the CPU 210.

The memory controller 250 which can be referred to as a memory interface may store an image or pixels output from the image signal processor 230 in the memory 310 or transmit the image (or pixels) stored in the memory 310 to the scaler circuit 240 through the bus architecture 203 according to a control of the CPU 210. An image in the present specification may be image data, and a pixel may be pixel data.

The display controller 260 may transmit data (or pixels, scaled-up pixels, or scaled-down pixels) transmitted through the bus architecture 203 to the display 320 according to a control of the CPU 210.

According to an exemplary embodiment, the display controller 260 may transmit data transmitted from the bus architecture 203 to the display 320 through a MIPI® display serial interface (DSI). According to an exemplary embodiment, an interface between the display controller 260 and the display 320 may be embodied in an interface supporting an embedded DisplayPort (eDP) protocol or a High-Definition Multimedia Interface (HDMI); however, it is not limited thereto.

The user interface 270 may sense a user input which is input through the user input device 330 and transmit a detection signal corresponding to a result of the sensing to the CPU 210 through the bus architecture 203.

The memory 310 may be embodied in a volatile memory and/or a non-volatile memory. The volatile memory may be embodied in a random access memory (RAM), a dynamic RAM (DRAM), or a static RAM (SRAM). The non-volatile memory may be embodied in a flash-based memory, a phase change RAM (PRAM), a resistive RAM (RRAM), or a spin-transfer torque random-access memory (STT-MRAM); however, it is not limited thereto.

Even if one memory controller 250 and one memory 310 are shown in FIG. 1; however, the data processing system 100 may include a plurality of memory controllers and a plurality of memories corresponding to the plurality of memory controllers according to exemplary embodiments. The plurality of memories may be different types of memories. For example, when the plurality of memories include a DRAM and a flash-based memory, a plurality of memory controllers may include a DRAM controller and a flash-based memory controller.

The display 320 may be embodied in a flat panel display. The flat panel display may be embodied in a thin film transistor-liquid crystal display (TFT-LCD), a light emitting diode (LED) display, an organic LED (OLED) display, an active-matrix OLED (AMOLED) display, or a flexible display, a double-sided display, or a transparent display.

The user input device 330 may be embodied in a touch screen, a touch screen panel, or a touch screen controller. The user input device 330 may be an electronic visual display which can perform sensing through a touch gesture occurring as a user touches the display 320 using a stylus pen or at least one finger.

Accordingly, the display 320 and the user input device 330 may be embodied in one module. A user may use the display 320 and/or the user input device 330 so as to zoom an image or a text displayed on the display 320. For example, FIG. 8A may be zoom-in, and FIG. 8B may be zoom-out.

Figure 2:
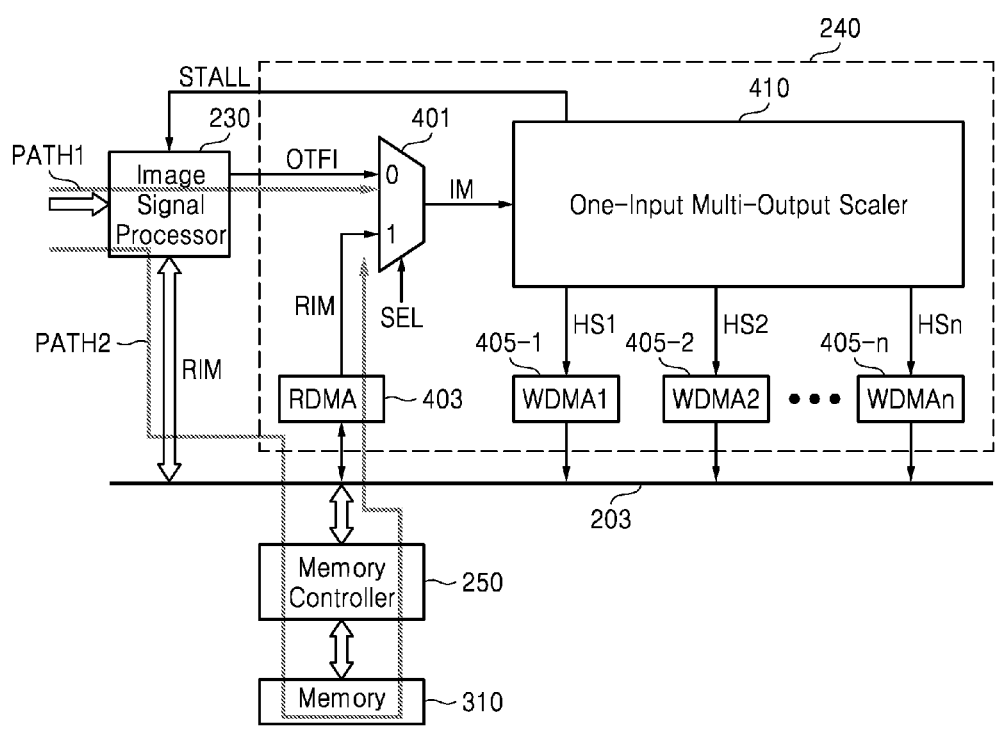
FIG. 2 is a block diagram which shows an exemplary embodiment of a scaler circuit shown in FIG. 1.

FIG. 2 is a block diagram which shows an exemplary embodiment of a scaler circuit shown in FIG. 1. Referring to FIGS. 1 and 2, the scaler circuit 240 may include a selector 401, a read direct memory access (DMA) controller 403, a plurality of write DMA controllers 405-1 to 405-n, where n is a natural number of three or more, and an one-input multi-output scaler 410. The bus architecture 203, the image signal processor 230, the scaler circuit 240, the memory controller 250, and the memory 310 are shown together in FIG. 2.

During a scale-down operation, an image (or pixels OTFI included in the image) processed by the image signal processor 230 may be transmitted to the scaler circuit 240 through a first path PATH1 and the selector 401 on-the-fly.

The selector 401 may transmit the pixels OTFI processed by the image signal processor 230 to the on-input multi-output scaler 410 in response to a selection signal SEL generated by the CPU 210 during a scale-down operation. However, the image (or pixels DMI included in the image) processed by the image signal processor 230 may be transmitted to the scaler circuit 240 through a second path PATH2 during a scale-up operation. The second path PATH2 may include the bus architecture 203, the memory controller 250, the memory 310, the read DMA controller 403, and the selector 401. For example, the pixels OTFI and the pixels DMI may be the same pixels as each other.

During the scale-up operation, the image signal processor 230 may transmit the pixels DMI to the memory controller 250 through the bus architecture 203 according to a control of the CPU 210. The memory controller 250 may store the pixels DMI in the memory 310 according to a control of the CPU 210. The read DMA controller 403 may read or fetch the pixels DIM stored in the memory 310, and transmit the red pixels DIM to the selector 401.

The selector 401 may transmit the pixels DIM output from the read DMA controller 403 to the one-input multi-output scaler 410 in response to a selection signal SEL generated by the CPU 210 during the scale-up operation. A first input terminal of the selector 401 may be connected to the first path PATH1, and a second input terminal of the selector 401 may be connected to the second path PATH2.

For example, the CPU 210 may generate a selection signal SEL having a first level, e.g., a low level or logic 0, during the scale-down operation, and the CPU 210 may generate a selection signal SEL having a second level, e.g., a high level or logic 1, during the scale-up operation. The selection signal SEL may be generated by the CPU 210.

The one-input multi-output scaler 410 may receive pixels IM sequentially output from the selector 401, and output pixels HS1 to HSn each scaled at a different scaling ratio at the same time or in a parallel manner. That is, the one-input multi-output scaler 410 may generate a plurality of images HS1 to HSn resized from a single image IM at the same time or in a parallel manner.

A first write DMA controller 405-1 may transmit pixels HS1 scaled at a first scaling ratio to the memory controller 250 and/or the display controller 260 through the bus architecture 203 according to a control of the CPU 210.

At the same time as or in a parallel manner with an operation of the first write DMA controller 405-1, a second write DMA controller 405-2 may transmit pixels HS2 scaled at a second scaling ratio to the memory controller 250 and/or the display controller 260 through the bus architecture 203 according to a control of the CPU 210.

At the same time as or in a parallel manner with an operation of the second write DMA controller 405-2, a nth write DMA controller 405-n may transmit pixels HSn scaled at an nth scaling ratio to the memory controller 250 and/or the display controller 260 through the bus architecture 203 according to a control of the CPU 210. For example, the memory controller 250 may write the pixels HS1, HS2, and/or HSn in the memory 310.

The image signal processor 230 may stop or delay a transmission of the pixels OTFI in response to a stall indication signal STALL output from the one-input multi-output scaler 410. For example, the one-input multi-output scaler 410 may generate a stall indication signal STALL having a second level during the scale-up operation. Accordingly, the image signal processor 230 may stop or delay the transmission of the pixels OTFI in response to the stall indication signal STALL having a second level.

Figure 3:
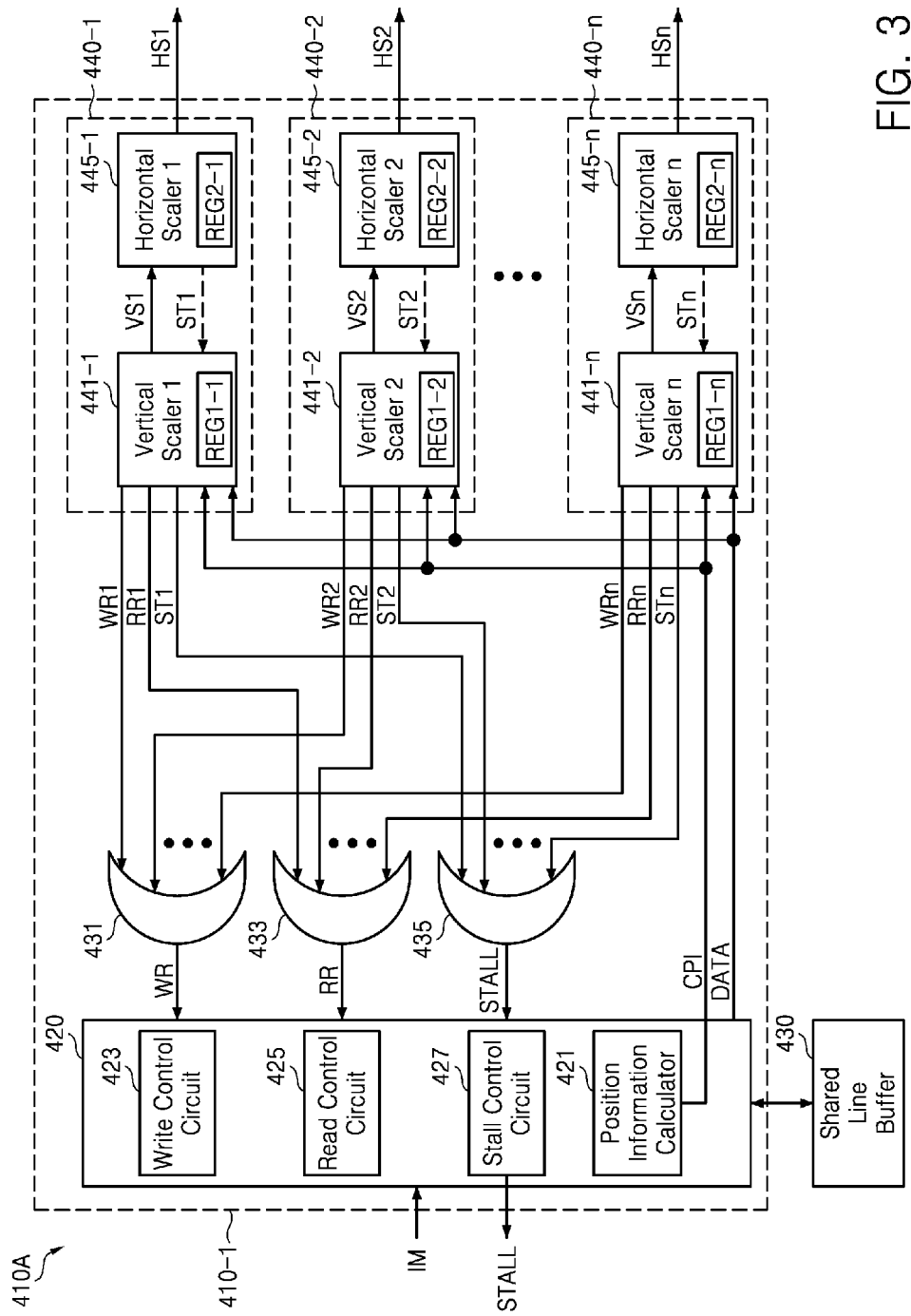
FIG. 3 is a block diagram which shows an exemplary embodiment of a one-input multi-output scaler shown in FIG. 2.

FIG. 3 is a block diagram which shows an exemplary embodiment of the one-input multi-output scaler shown in FIG. 2. Referring to FIG. 3, a one-input multi-output scaler 410A may include a scaler core 410-1 and a line memory 430. Even if it is shown in FIG. 3 that the one-input multi-output scaler 410A includes the line memory 430, but the line memory 430 may be disposed outside the one-input multi-output scaler 410A. The line memory 430 may be embodied in a line buffer which can store line data corresponding to at least one line.

The scaler core 410-1 may include circuits or logic circuits which can perform a scaling operation. The scaler core 410-1 may include a line memory controller 420, a write request signal generator 431, a read request signal generator 433, a stall indication signal generator 435, and a plurality of scalers 440-1 to 440-n. Each of the plurality of scalers 440-1 to 440-n may perform a horizontal scaling operation after a vertical scaling operation.

Referring to FIGS. 2 and 3, the line memory controller 420 may receive pixels IM which are sequentially input through one of the first path PATH1 and the second path PATH2, and transmit position information CPU of a current pixel which is input at different time points among the received pixels IM to each of the plurality of scalers 440-1 to 440-n.

The line memory controller 420 may write first pixels among the pixels IM in the line memory 430 in response to a write request signal WR output from the write request signal generator 431. For example, the line memory controller 420 may write first pixels among the pixels IM in the line memory 430 while the write request signal WR maintains a second level. Moreover, the line memory controller 420 may read second pixels stored in the line memory 430 and transmit the read second pixels to each of the plurality of scalers 440-1 to 440-n as image data DATA in response to the read request signal RR output from the read request signal generator 433.

The line memory controller 420 may transmit a stall indication signal STALL output from the stall indication signal generator 435 to the image signal processor 230. That is, the line memory controller 420 according to an exemplary embodiment may not store all of the pixels IM in the line memory 430, but selectively store only pixels corresponding to the write request signal WR.

The line memory controller 420 may include a position information calculator 421, a write control circuit 423, a read control circuit 425, and a stall control circuit 427.

The position information calculator 421 may generate position information CPI on each of the pixels IM. According to an exemplary embodiment, the position information calculator 421 may calculate coordinates of a current pixel among the pixels IM, and transmit position information CPI corresponding to a result of the calculation to each of the plurality of scalers 440-1 to 440-n. A current pixel may be a pixel input at a specific time point among the pixels IM.

The write control circuit 423 may store first pixels to be processed in each of the plurality of scalers 440-1 to 440-n among the pixels IM in the line memory 430 in response to a write request signal WR. The read control circuit 425 may read second pixels to be processed in each of the plurality of scalers 440-1 to 440-n among the pixels stored in the line memory 430, and transmit the read second pixels to each of the plurality of scalers 440-1 to 440-n in response to a read request signal RR.

The stall control circuit 427 may control a transmission of the stall indication signal STALL to the image processing processor 230. The line memory 430 may store the first pixels to be processed in each of the plurality of scalers 440-1 to 440-n among the pixels IM, or read second pixels to be processed in each of the plurality of scalers 440-1 to 440-n among the pixels stored in the line memory 430 according to a control of the line memory controller 420.

According to an exemplary embodiment, the line memory 430 may be embodied in a RAM, a DRAM, or a SRAM; however, it is not limited thereto. The line memory 430 may be shared by the plurality of scalers 440-1 to 440-n. For example, the line memory 430 may be shared by the plurality of scalers 441-1 to 441-n.

The write request signal generator 431 may generate a write request signal WR based on each of write request signals WR1 to WRn output from each of the scalers 440-1 to 440-n. For example, the write request signal generator 431 may be embodied in an OR gate; however, it is not limited thereto. The read request signal generator 433 may generate a read request signal RR based on each of read request signals RR1 to RRn output from each of the scalers 440-1 to 440-n. For example, the read request signal generator 433 may be embodied in the OR gate; however, it is not limited thereto.

The stall indication signal generator 435 may generate a stall indication signal STALL based on each of stall indication signals ST1 to STn output from each of the scalers 440-1 to 440-n. For example, the stall indication signal generator 435 may be embodied in the OR gate; however, it is not limited thereto.

The first scaler 440-1 may scale pixels included in a first region of an original image and generate the scaled pixels HS1 according to a first scaling ratio.

The first scaler 440-1 may include a first vertical scaler 441-1 and a first horizontal scaler 445-1. The first vertical scaler 441-1 may vertically scale the pixels included in the first region according to the first vertical scaling ratio, and output the vertically scaled pixels VS1. The first horizontal scaler 445-1 may horizontally scale the vertically scaled pixels VS1 output from the first vertical scaler 441-1 according to a first horizontal scaling ratio, and output the horizontally scaled pixels HS1.

The first scaling ratio may be determined according to the first vertical scaling ratio and the first horizontal scaling ratio. For example, the first vertical scaling ratio and the first horizontal scaling ratio may be a ratio for a scale-up or a scale-down, respectively.

When the first horizontal scaler 445-1 scales up the vertically scaled pixels VS1 output from the first vertical scaler 441-1, the first horizontal scaler 445-1 may output the first stall indication signal ST1 to the first vertical scaler 441-1. The first vertical scaler 441-1 may stop or delay a transmission of the vertically scaled pixels VS1 to the first horizontal scaler 445-1 in response to the first stall indication signal ST1. Moreover, the first vertical scaler 441-1 may transmit the first stall indication signal ST1 to the stall indication signal generator 435 in response to the first stall indication signal ST1 output from the first horizontal scaler 445-1.

A stall control circuit 427 of the line memory controller 420 may output a stall indication signal STALL to the image processing processor 230. Accordingly, the image processing processor 230 may stop or delay a transmission of the pixels OTFI to the scaler circuit 240 in response to the stall indication signal STALL.

When the first vertical scaler 441-1 scales up image data DATA corresponding to the pixels included in the first region output from the line memory controller 420, the first vertical scaler 441-1 may transmit the first stall indication signal ST1 to the stall indication signal generator 435. Accordingly, the stall control circuit 427 of the line memory controller 420 may output the stall indication signal STALL to the image processing processor 230. Accordingly, the image processing processor 230 may stop or delay a transmission of the pixels OTFI to the scaler circuit 240 in response to the stall indication signal STALL.

As described above, when at least one of the first vertical scaler 441-1 and the first horizontal scaler 445-1 performs a scale-up operation, the stall indication signal generator 435 may generate the stall indication signal STALL.

At the same time as or in a parallel manner with the first scaler 440-1, the second scaler 440-2 may scale pixels included in the second region of the original image and generate the scaled pixels HS2 according to a second scaling ratio.

The second scaler 440-2 may include a second vertical scaler 441-2 and a second horizontal scaler 445-2. The second vertical scaler 441-2 may vertically scale the pixels included in the second region according to a second vertical scaling ratio, and output the vertically scaled pixels VS2. The second horizontal scaler 445-2 may horizontally scale the vertically scaled pixels VS2 output from the second vertical scaler 441-2 according to a second horizontal scaling ratio, and output the horizontally scaled pixels HS2.

The second scaling ratio may be determined according to the second vertical scaling ratio and the second horizontal scaling ratio. For example, the second vertical scaling ratio and the second horizontal scaling ratio may be a ratio for a scale-up or a scale-down, respectively.

When the second horizontal scaler 445-2 scales up the vertically scaled pixels VS2 output from the second vertical scaler 441-2, the second horizontal scaler 445-2 may output a second stall indication signal ST2 to the second vertical scaler 441-2. The second vertical scaler 441-2 may stop or delay a transmission of the vertically scaled pixels VS2 to the second horizontal scaler 445-2 in response to the second stall indication signal ST2. Moreover, the second vertical scaler 441-2 may transmit the second stall indication signal ST2 to the stall indication signal generator 435 in response to the second stall indication signal ST2 output from the second horizontal scaler 445-2.

The stall control circuit 427 of the line memory controller 420 may output a stall indication signal STALL to the image processing processor 230. Accordingly, the image processing processor 230 may stop or delay a transmission of the pixels OTFI transmitted to the scaler circuit 240 in response to the stall indication signal STALL.

When the second vertical scaler 441-2 scales up image data DATA corresponding to the pixels included in the second region output from the line memory controller 420, the second vertical scaler 441-2 may transmit the second stall indication signal ST2 to the stall indication signal generator 435. Accordingly, the stall control circuit 427 of the line memory controller 420 may output the stall indication signal STALL to the image processing processor 230. Accordingly, the image processing processor 230 may stop or delay a transmission of the pixels OTFI transmitted to the scaler circuit 240 in response to the stall indication signal STALL.

As described above, when at least one of the second vertical scaler 441-2 and the second horizontal scaler 445-2 performs a scale-up operation, the stall indication signal generator 435 may generate a stall indication signal STALL.

At the same time as or in the parallel manner with an operation of the second scaler 440-2, an nth scaler 440-$n$ may scale pixels included in an nth region of the original image and generate the scaled pixels HSn according to an nth scaling ratio.

The $n^{th}$ scaler 440-$n$ may include an $n^{th}$ vertical scaler 441-$n$ and an $n^{th}$ horizontal scaler 445-$n$. The $n^{th}$ vertical scaler 441-$n$ may vertically scale the pixels included in the $n^{th}$ region according to an $n^{th}$ vertical scaling ratio, and output the vertically scaled pixels VSn. The $n^{th}$ horizontal scaler 445-$n$ may horizontally scale the vertically scaled pixels VSn output from the $n^{th}$ vertical scaler 441-$n$, and output the horizontally scaled pixels HSn.

The $n^{th}$ scaling ratio may be determined according to the $n^{th}$ vertical scaling ratio and the $n^{th}$ horizontal scaling ratio. For example, the $n^{th}$ vertical scaling ratio and the $n^{th}$ horizontal scaling ratio may be a ratio for a scale-up or a scale-down, respectively.

When the $n^{th}$ horizontal scaler 445-$n$ scales up the vertically scaled pixels VSn output from the $n^{th}$ vertical scaler 441-$n$, the $n^{th}$ horizontal scaler 445-$n$ may output an $n^{th}$ stall indication signal STn to the $n^{th}$ vertical scaler 441-$n$. The $n^{th}$ vertical scaler 441-$n$ may stop or delay a transmission of the vertically scaled pixels VSn transmitted to the $n^{th}$ horizontal scaler 445-$n$ in response to an $n^{th}$ stall indication signal STn. Moreover, the $n^{th}$ vertical scaler 441-$n$ may transmit the $n^{th}$ stall indication signal STn to the stall indication signal generator 435 in response to the $n^{th}$ stall indication signal STn.

The stall control circuit 427 of the line memory controller 420 may output the stall indication signal STALL to the image processing processor 230. Accordingly, the image processing processor 230 may stop or delay a transmission of the pixels OTFI transmitted to the scaler circuit 240 in response to the stall indication signal STALL.

When the $n^{th}$ vertical scaler 441-$n$ scales up image data DATA corresponding to the pixels included in the second region output from the line memory controller 420, the $n^{th}$ vertical scaler 441-$n$ may transmit the $n^{th}$ stall indication signal STn to the stall indication signal generator 435. Accordingly, the stall control circuit 427 of the line memory controller 420 may output the stall indication signal STALL to the image processing processor 230. Accordingly, the image processing processor 230 may stop or delay a transmission of the pixels OTFI transmitted to the scaler circuit 240 in response to the stall indication signal STALL.

As described above, when at least one of the $n^{th}$ vertical scaler 441-$n$ and the $n^{th}$ horizontal scaler 445-$n$ performs a scale-up operation, the stall indication signal generator 435 may generate the stall indication signal STALL.

Corresponding regions processed by each of the vertical scalers 440-1 to 440-$n$ may be different from each other in size. Moreover, scaling ratios of the scalers 440-1 to 440-$n$ may be different from each other. Each of the scalers 440-1 to 440-$n$ may process pixels included in a region allocated to each of the scalers 440-1 to 440-$n$ at the same time or in a parallel manner.

Each of the vertical scalers 441-1 to 441-$n$ may include each of storage devices REG1-1 to REG1-$n$ which store data or information necessary for operations of each of the vertical scalers 441-1 to 441-$n$. For example, each of the storage devices REG1-1 to REG1-$n$ may be a memory which can be set or programmed by the CPU 210. According to an exemplary embodiment, each of the storage devices REG1-1 to REG1-$n$ may be embodied in a register, e.g., a special function register (SFR), but it is not limited thereto. Each of the storage devices REG1-1 to REG1-$n$ may store region information and a scaling ratio.

Each of the horizontal scalers 445-1 to 445-$n$ may include each of storage devices REG2-1 to REG2-$n$ which store data or information necessary for operations of each of the horizontal scalers 445-1 to 445-$n$. Each of the storage devices REG2-1 to REG2-$n$ may be a memory which can be set or programmed by the CPU 210. According to an exemplary embodiment, each of the storage devices REG2-1 to REG2-$n$ may be embodied in a register, e.g., a special function register (SFR), but it is not limited thereto. Each of the storage devices REG2-1 to REG2-$n$ may store a scaling ratio.

Figure 4:
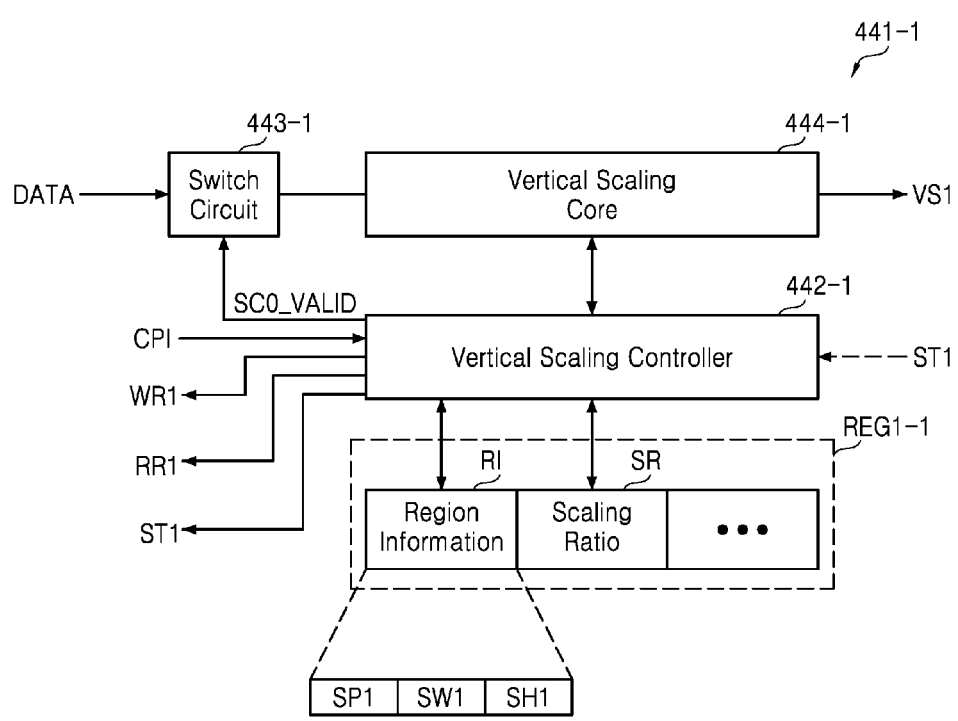
FIG. 4 is a block diagram of a first vertical scaler shown in FIG. 3.
Figure 6:
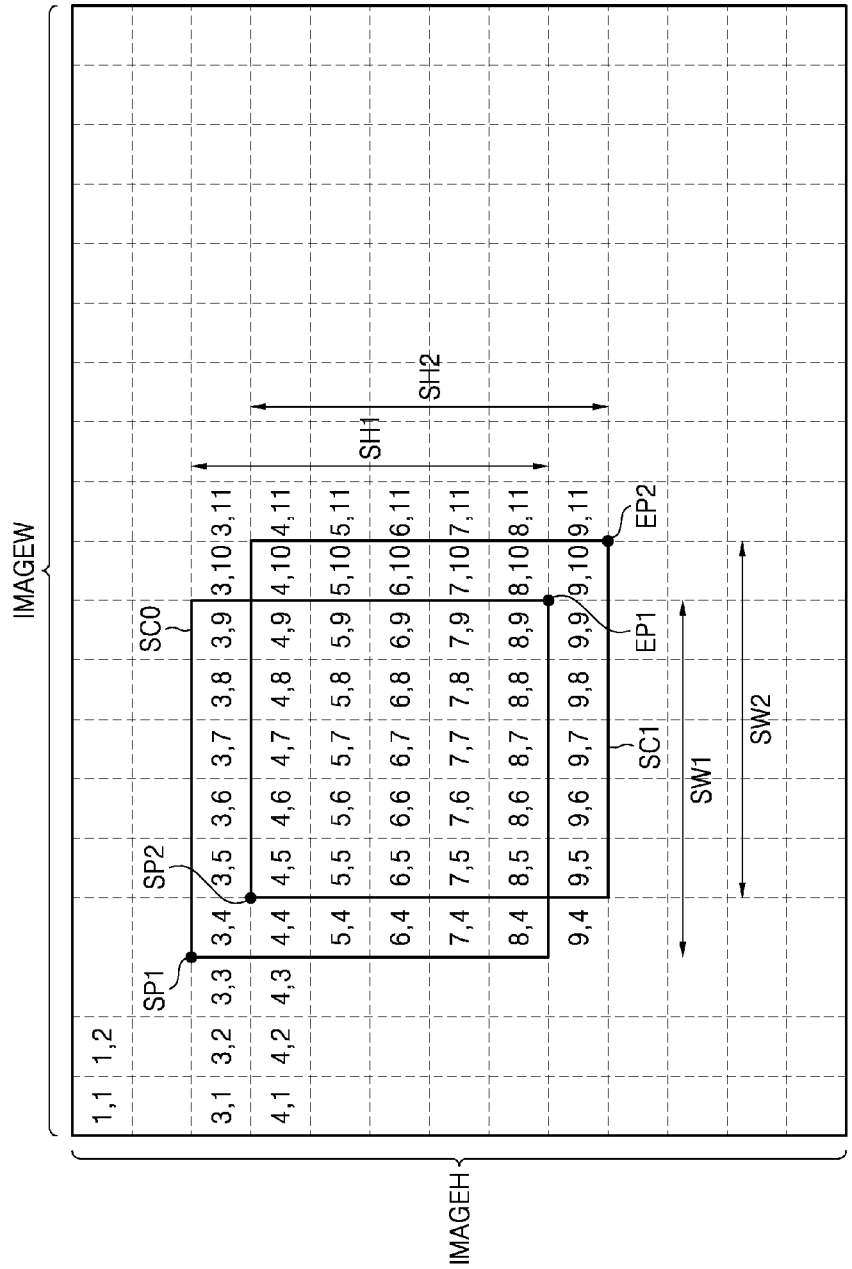
FIG. 6 conceptually shows different regions included in an original image.
Figure 7A:
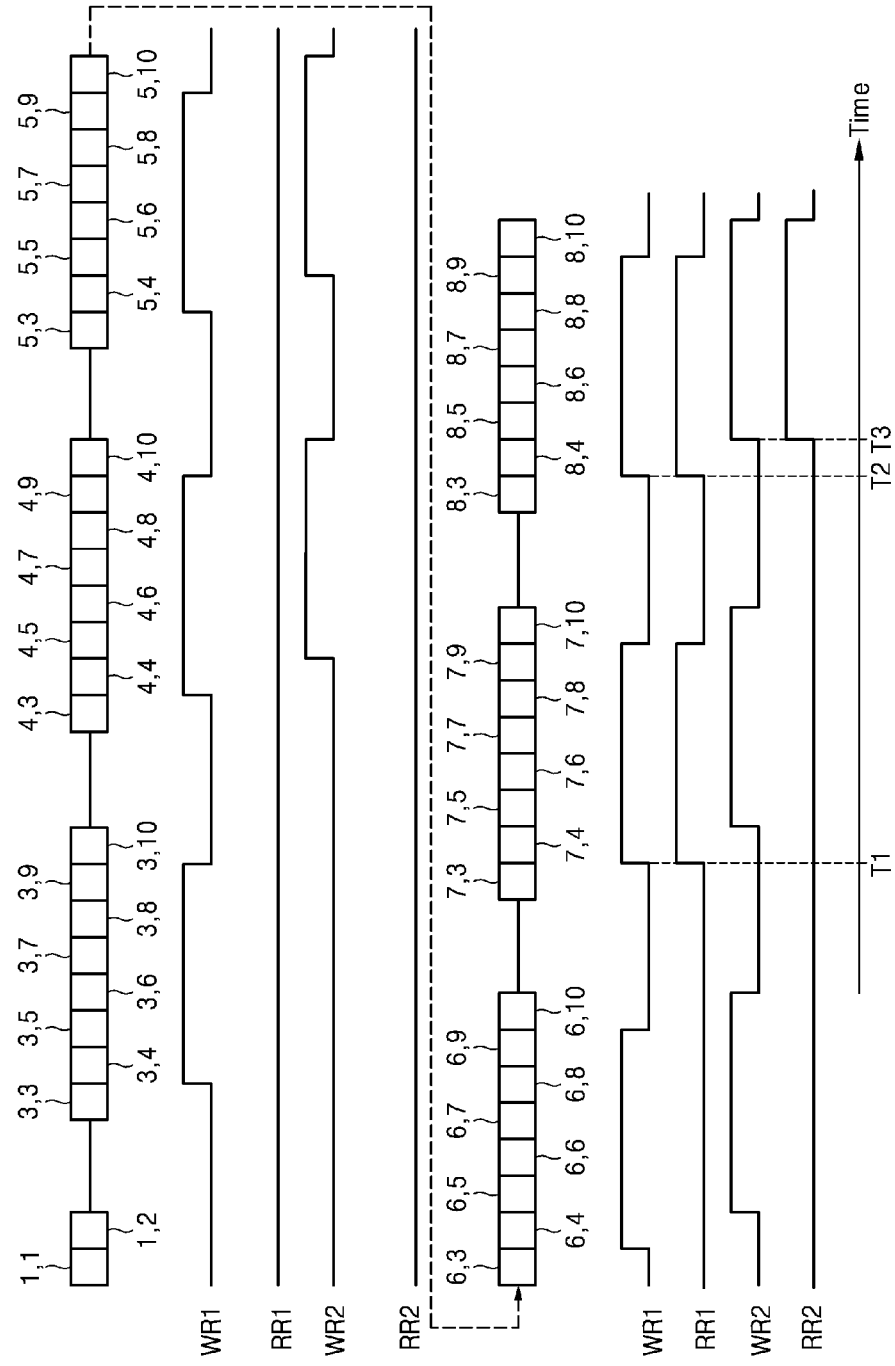

FIG. 4 is a block diagram of a first vertical scaler shown in FIG. 3, FIG. 6 conceptually shows different regions included in the original image, FIGS. 7A to 7C are conceptual diagrams which describe a process of processing a first region and a second region included in the original image shown in FIG. 6, and FIGS. 8A and 8B conceptually show a scale-up and a scale-down.

Since the vertical scalers 441-1 to 441-$n$ are the same as or similar to each other in structure and operation, a structure and an operation of the first vertical scaler 441-1 will be described in detail referring to FIGS. 1 to 8.

The first vertical scaler 441-1 may include a vertical scaling controller 442-1, a switch circuit 443-1, a vertical scaling core 444-1, and a storage device REG1-1.

The original image may be determined by a width IMAGEW and a height IMAGEH. Each of the width IMAGEW and the height IMAGEH may be determined according to the number of pixels.

It is assumed that the first scaler 440-1 performs a scaling operation on pixels included in a first region SC0 among the pixels included in the original image, and the second scaler 440-2 performs a scaling operation on pixels included in a second region SC1 among the pixels included in the original image.

It is assumed that a storage device REG1-1 included in the first scaler 440-1 includes a first storage region RI storing first region information and a second storage region SR storing a first scaling ratio. It is also assumed that a storage device REG1-2 included in the second scaler 440-2 includes a first storage region RI storing second region information and a second storage region SR storing a second scaling ratio.

The first storage region RI of the storage device REG1-1 may store a size of the first region SC0 or information on the size. For example, the size may include a first start coordinates SP1 of the first region SC0, a first width SW1 of the first region SC0, and a first height SH1 of the first region SC0. For example, a first end coordinates EP1 of the first region SC0 may be determined by the first start coordinates SP1, the first width SW1, and the first height SH1. According to an exemplary embodiment, the first storage region RI of the storage device REG1-1 may store the first start coordinates SP1 of the first region SC0 and the first end coordinates EP1 of the first region SC0; however, it is not limited thereto.

The first storage region RI of the storage device REG1-2 may store a size of the second region SC1 or information on the size. For example, the size may include a second start coordinates SP2 of the second region SC1, a second width SW2 of the second region SC1, and a second height SH2 of the second region SC1. For example, a second end coordinates EP2 of the second region SC1 may be determined by the second start coordinates SP2, the second width SW2, and the second height SH2. According to an exemplary embodiment, the first storage region RI of the storage device REG1-2 may store the second start coordinates SP2 of the second region SC1 and the second end coordinates EP2 of the second region SC1; however, it is not limited thereto.

It is enough that the first storage region RI of each of the storage devices REG1-1 and REG1-2 stores information which can define a size of each of the regions SC0 and SC1. According to exemplary embodiments, the regions SC0 and SC1 may or may not overlap.

The vertical scaling controller 442-1 of the first scaler 440-1 may control an activation timing of a switch signal SC0_VALID, an activation timing of a first write request signal WR1, an activation timing of a first read request signal RR1, and an activation timing of a first stall indication signal ST1. Here, activation may be one of a high level and a low level; however, an activation level in FIGS. 7A to 7C is assumed to be a high level.

A vertical scaling controller of the second scaler 440-2 may control an activation timing of a switch signal SC1_VALID, an activation timing of a second write request signal WR2, an activation timing of a second read request signal RR2, and an activation timing of a second stall indication signal ST2, using data or information stored in the storage device REG1-2.

The vertical scaling controller 442-1 of the first scaler 440-1 may control a vertical scaling ratio of the vertical scaling core 441-1 using data stored in the second storage region SR of the storage device REG1-1. A vertical scaling controller of the second scaler 440-2 may control a vertical scaling ratio of the vertical scaling core 441-2 using data stored in the second storage region of the storage device REG1-2.

The pixels IM included in the original image or an original frame may be sequentially input to the line memory controller 420. The position information calculator 421 may calculate a position (1,1) of a current pixel among the pixels IM, and transmit position information CPI corresponding to the calculated position to each of the vertical scalers 441-1 to 441-n.

The vertical scaling controller 442-1 of the first vertical scaler 441-1 may compare a current coordinates (1,1) corresponding to the position information CPI with a first start coordinates SP1=(3,4), and output the first write request signal WR1 having a low level to the write request signal generator 431 according to a result of the comparison. Moreover, the vertical scaling controller 442-1 may output the first read request signal RR1 having a low level to the read request signal generator 433 according to a result of the comparison. In addition, the vertical scaling controller 442-1 may output a switch signal SC0_VALID having a low level to the switch circuit 443-1 according to a result of the comparison.

Here, (x,y) shows a coordinates (or position) of a pixel; however, it is assumed that (x,y) is a coordinates or a pixel for convenience of description. Accordingly, the write request signal generator 431 generates a write request signal WR having a low level, such that the write control circuit 423 does not store a current pixel (1,1) in the lie memory 430. According to an exemplary embodiment, the current pixel (1,1) may be discarded.

According to an exemplary embodiment, even if the current pixel (1,1) is transmitted to the first vertical scaler 441-1, the vertical scaling controller 442-1 outputs a switch signal SC0_VALID having a low level, the current pixel (1,1) is not transmitted to the vertical scaling core 444-1.

Processing for respective pixels (1,2), (3,1), (3,2), (3,3), (3,10), (3,11), (4,1), (4,2), (4,3), (4,10), (4,11), (5,10), (5,11), (6,10), (6,11), (7,10), (7,11), (8,10), (8,11), (9,4), and the like which are not included in the first region SC0 is the same as processing for the pixel (1,1) which is not included in the first region SC0, such that detailed description on processing for respective pixels (1,2), (3,1), (3,2), (3,3), (3,10), (3,11), (4,1), (4,2), (4,3), (4,10), (4,11), (5,10), (5,11), (6,10), (6,11), (7,10), (7,11), (8,10), (8,11), (9,4), and the like will be omitted.

However, the position information calculator 421 may calculate a position of a current pixel (3,4) among the pixels IM, and transmit position information CPI corresponding to the calculated position to each of the vertical scalers 441-1 to 441-n.

The vertical scaling controller 442-1 of the first vertical scaler 441-1 compares a current coordinates (3,4) corresponding to the position information CPI with a first start coordinates SP1=(3,4), and output the first write request signal WR1 having a high level to the write request signal generator 431 according to a result of the comparison. Moreover, the vertical scaling controller 442-1 may output the first read request signal RR1 having a low level to the read request signal generator 433 according to a result of the comparison. In addition, the vertical scaling controller 442-1 may output a switch signal SC0_VALID having a low level to the switch circuit 443-1 according to a result of the comparison. The write request signal generator 431 generates a write request signal WR having a high level, such that the write control circuit 423 may store the current pixel (3,4) in the line memory 430.

Processing for respective pixels (3,5) to (3,9), (4,4) to (4,9), (5,4) to (5,9), (6,4) to (6,9), (7,4) to (7,9), and (8,4) to (8,9) included in the first region SC0 is the same as processing for the pixel (3,4) include in the first region SC0, such that detailed description on processing for respective pixels (3,5) to (3,9), (4,4) to (4,9), (5,4) to (5,9), (6,4) to (6,9), (7,4) to (7,9), and (8,4) to (8,9) will be omitted.

It is assumed that a read operation is performed in units of 4*6 pixels. When a current pixel (7,4) is input to the line memory controller 420 at a first time point T1 after 4*6 pixels (3,4) to (3,9), (4,4) to (4,9), (5,4) to (5,9), and (6,4) to (6,9) are stored in the line memory 430, the position information calculator 421 may calculate a position of the current pixel (7,4), and transmit position information CPI corresponding to the calculated position to each of the vertical scalers 441-1 to 441-n.

At a first time point T1, the vertical scaling controller 442-1 of the first vertical scaler 441-1 may generate a first write request signal WR1 having a high level, a first read request signal RR1 having a high level, and a switch signal SC0_VALID having a high level based on the current coordinates (7,4) corresponding to the position information CPI.

Accordingly, the write control circuit 423 may write the current pixel (7,4) in the line memory 430, the read control circuit 425 may read the 4*6 pixels (3,4) to (3,9), (4,4) to (4,9), (5,4) to (5,9), and (6,4) to (6,9) stored in the line memory 430, and transmit image data DATA corresponding to the read pixels to each of the vertical scalers 441-1 to 441-*n*.

The vertical scaling controller 442-1 of the first vertical scaler 441-1 generates a switch signal SC0_VALID having a high level, such that the switch circuit 443-1 may transmit image data DATA corresponding to the 4*6 pixels (3,4) to (3,9), (4,4) to (4,9), (5,4) to (5,9), and (6,4) to (6,9) to the vertical scaling core 444-1 in response to the switch signal SC0-VALID having a high level. The image data DATA may include a plurality of image data SC0_DATA0 to SC0_DATA3 as shown in FIG. 7B. For example, the plurality of image data SC0_DATA0 to SC0_DATA3 may be transmitted in a parallel manner.

The vertical scaling core 444-1 may vertically scale the image data DATA corresponding to the 4*6 pixels (3,4) to (3,9), (4,4) to (4,9), (5,4) to (5,9), and (6,4) to (6,9) according to the first vertical scaling ratio stored in the first storage region SR, and output the vertically scaled pixels VS1. Each of pixels (7,5) to (7,9) is stored in the line memory 430 in the same manner as a method in which the pixel (7,4) is stored in the line memory 430.

When a current pixel (8,4) is input to the line memory controller 420 at a second time point T2 after 4*6 pixels (4,4) to (4,9), (5,4) to (5,9), and (6,4) to (6,9), and (7,4) to (7,9) are stored in the line memory 430, the position information calculator 421 may calculate a position of the current pixel (8,4), and transmit position information CPI corresponding to the calculated position to each of the vertical scalers 441-1 to 441-*n*.

The vertical scaling controller 442-1 of the first vertical scaler 441-1 may generate a first write request signal WR1 having a high level, a first read request signal RR1 having a high level, and a switch signal SC0_VALID having a high level based on the current coordinates (8,4) corresponding to the position information CPI.

Accordingly, the write control circuit 423 may write the current pixel (8,4) in the line memory 430, the read control circuit 425 may read 4*6 pixels (4,4) to (4,9), (5,4) to (5,9), and (6,4) to (6,9), and (7,4) to (7,9) stored in the line memory 430, and transmit image data DATA corresponding to the read pixels (4,4) to (4,9), (5,4) to (5,9), and (6,4) to (6,9), and (7,4) to (7,9) to each of the vertical scalers 441-1 to 441-*n*.

Since the vertical scaling controller 442-1 of the first vertical scaler 441-1 generates a switch signal SC0_VALID having a high level, the switch circuit 443-1 may transmit the image data DATA corresponding to the 4*6 pixels (4,4) to (4,9), (5,4) to (5,9), and (6,4) to (6,9), and (7,4) to (7,9) to the vertical scaling core 444-1 in response to the switch signal SC0_VALID having a high level. The image data DATA may include the plurality of image data SC0_DATA0 to SC0_DATA3 as shown in FIG. 7B. For example, the plurality of image data SC0_DATA0 to SC0_DATA3 may be transmitted in a parallel manner.

The vertical scaling core 444-1 may vertically scale the image data DATA corresponding to the 4*6 pixels (4,4) to (4,9), (5,4) to (5,9), and (6,4) to (6,9), and (7,4) to (7,9) according to the first vertical scaling ratio stored in the first storage region SR, and output the vertically scaled pixels VS1.

The second scaler 440-2 may generate a second write request signal WR2 having a high level so as to store pixels (4,5) to (4,10), (5,5) to (5,10), and (6,5) to (6,10), (7,5) to (7,10), and (8,5) to (8,10) included in a second region SC1 among the pixels IM included in the original image in the line memory 430.

When a current pixel (8,5) is input to the line memory controller 420 at a third time point T3 after 4*6 pixels (4,5) to (4,10), (5,5) to (5,10), and (6,5) to (6,10), and (7,5) to (7,10) among the pixels (4,5) to (4,10), (5,5) to (5,10), and (6,5) to (6,10), (7,5) to (7,10), and (8,5) to (8,10) included in the second region SC1 are stored in the line memory 430, the position information calculator 421 may calculate a position of the current pixel (8,5), and transmit position information CPI corresponding to the calculated position to each of the vertical scalers 441-1 to 441-*n*.

At a third time point T3, a vertical scaling controller of the second vertical scaler 441-2 may generate a second write request signal WR2 having a high level, a second read request signal RR2 having a high level, and a switch signal SC1_VALID having a high level based on the current coordinates (8,5) corresponding to the position information CPI.

Accordingly, the write control circuit 423 may write the current pixel (8,5) in the line memory 430, the read control circuit 425 reads the 4*6 pixels (4,5) to (4,10), (5,5) to (5,10), and (6,5) to (6,10), and (7,5) to (7,10) stored in the line memory 430, and transmit image data DATA corresponding to the read pixels (4,5) to (4,10), (5,5) to (5,10), and (6,5) to (6,10), and (7,5) to (7,10) to each of the vertical scalers 441-1 to 441-*n*.

Since the vertical scaling controller of the second vertical scaler 441-2 generates a switch signal SC1_VALID having a high level, a switch circuit of the second vertical scaler 441-2 may transmit the image data DATA corresponding to the 4*6 pixels (4,5) to (4,10), (5,5) to (5,10), and (6,5) to (6,10), and (7,5) to (7,10) to a vertical scaling core of the second vertical scaler 441-2 in response to the switch signal SC1_VALID having a high level. The image data DATA may include a plurality of image data SC1_DATA0 to SC1_DATA3 as shown in FIG. 7C. For example, the plurality of image data SC1_DATA0 to SC1_DATA3 may be transmitted in a parallel manner.

The vertical scaling core of the second vertical scaler 441-2 may vertically scale the image data DATA corresponding to the 4*6 pixels (4,5) to (4,10), (5,5) to (5,10), and (6,5) to (6,10), and (7,5) to (7,10) according to a second vertical scaling ratio stored in the first storage region, and output vertically scaled pixels VS2.

At a third time point T3, an operation of the first vertical scaler 441-1 and an operation of the second vertical scaler 441-2 may be performed in a parallel manner. That is, for given time from the third time point T3, an operation of the first scaler 440-1 and an operation of the second scaler 440-2 may be performed in a parallel manner. For example, the operation of the first scaler 440-1 may partially or entirely overlap with the operation of the second scaler 440-2.

Figure 5:
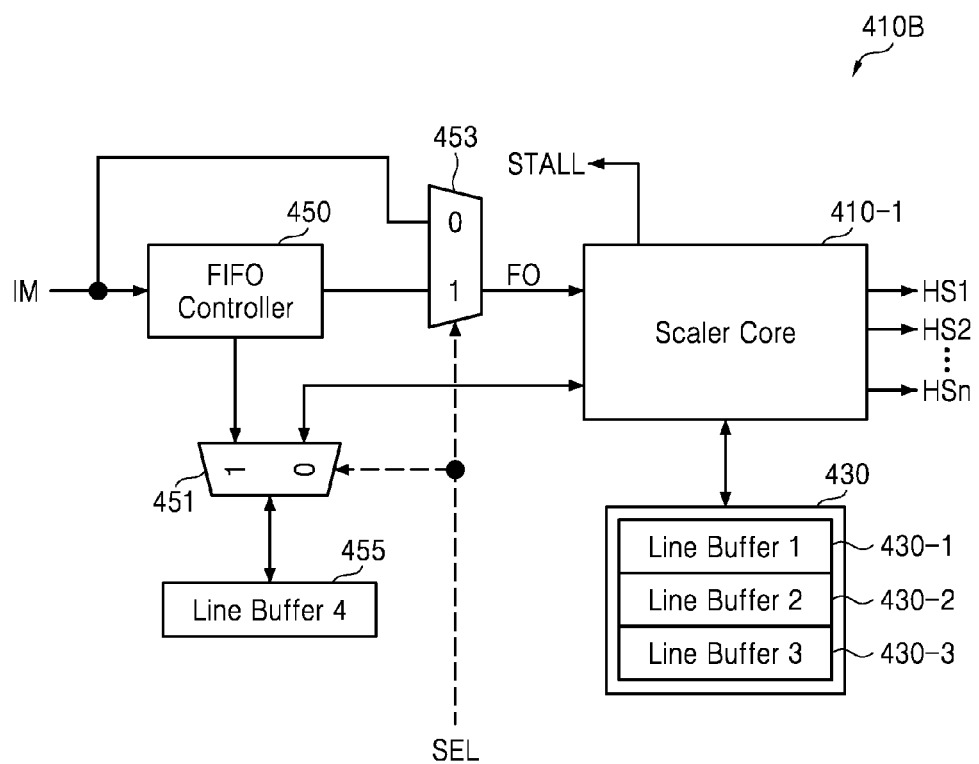
FIG. 5 is a block diagram which shows another exemplary embodiment of the one-input multi-output scaler shown in FIG. 2.

FIG. 5 is a block diagram which shows another exemplary embodiment of the one-input multi-output scaler shown in FIG. 2. Referring to FIGS. 2 and 5, an one-input multi-output scaler 410B may include the scaler core 410-1, the line memory 430, a first in first out (FIFO) controller 450, a first selector 451, a second selector 453, and a line buffer 455. For example, FIFO may include the FIFO controller 450 and the line buffer 455.

Except that input pixels are changed from IM to PO, a structure and an operation of the scaler core 410-1 of FIG. 3 are the same as a structure and an operation of the scaler core 410-1 of FIG. 5, such that a detailed description on the scaler core 410-1 of FIG. 5 will be omitted.

A scaler which can perform a scaling operation in units of K pixels, where K is a natural number of two or more, needs K line buffers so as to perform a scale-up operation (or an up-sampling operation), and needs (K−1) line buffers so as to perform a scale-down operation (or down-sampling operation). K pixels may be pixels included in the same row or the same column included in the original image.

It is assumed that the scaler core 410-1 performs a scaling operation in units of four pixels, the line memory 430 includes three line buffers 430-1, 430-2, and 430-3, and FIFO includes one line buffer 455. It is assumed that a selection signal SEL has a first level during the scale-up operation and the selection signal SEL has a second level during the scale-down operation. It is assumed that a level of the selection signal SEL is determined based on data or information stored in a register, e.g., SFR. Data or information on a scaling ratio is assumed to be stored in the SFR.

When a selection signal SEL having a first level (e.g., logic 0) is generated, the line buffer 455 is connected to the scaler core 410-1 through the first selector 451. Accordingly, the scaler core 410-1 may use four line buffers 430-1, 430-2, 430-3, and 455 during the scale-up operation. That is, the scaler core 410-1 may perform a scaling operation on pixels stored in four line buffers 430-1, 430-2, 430-3, and 455.

When a selection signal SEL having a first level is generated, the pixels IM (sequentially) output from the selector 401 of FIG. 2 may be input to the scaler core 410-1 as input pixels FO through the second selector 453. That is, the pixels IM bypass the FIFO controller 450.

When a selection signal SEL having a second level is generated, the line buffer 455 is connected to the FIFO controller 450 through the first selector 451. Accordingly, the scaler core 410-1 may access only three line buffers 430-1, 430-2, and 430-3 during the scale-down operation.

The pixels IM output from the selector 401 of FIG. 2 may be input to the scaler core 410-1 as input pixels FO through the FIFO controller 450, the line buffer 455, and the second selector 453. Accordingly, a one-input multi-output scaler 410B may operate as a hard real time system through FIFO during the scale-down operation. For example, when the one-input multi-output scaler 410B which performs processing in units of K pixels operates as a hard real time system, the number of line buffers necessary for a scale-down is (K−1), such that a remaining line buffer (e.g., 455) may be used as a buffer for the hard real time system.

The first selector 451 may be embodied in a de-multiplexer, and the second selector 453 may be embodied in a multiplexer. Through the first selector 451 operating according to a level of the selection signal SEL, the FIFO controller 450 and the scaler core 410-1 may use the line buffer 455. That is, the line buffer 455 may be used as a shared line buffer.

FIFO may overcome latency or delay such as blackout of a memory 310 or address translation miss of a memory management unit (MMU) during the scale-down operation. When the memory 310 is embodied in a DRAM, the blackout may be generated when data cannot be written in the DRAM due to a refresh operation of the DRAM. FIFO is embodied in the one-input multi-output scaler 410B, and thereby a region of DMA FIFO which can be used by at least one of the plurality of write DMA controllers 405-1 to 405-n may be reduced.

Through the second selector 453 which operates according to a level of the selection signal SEL, input pixels IM of the FIFO controller 450 or output pixels of the FIFO controller 450 may be provided as input pixels FO of the scaler core 410-1.

Figure 9:
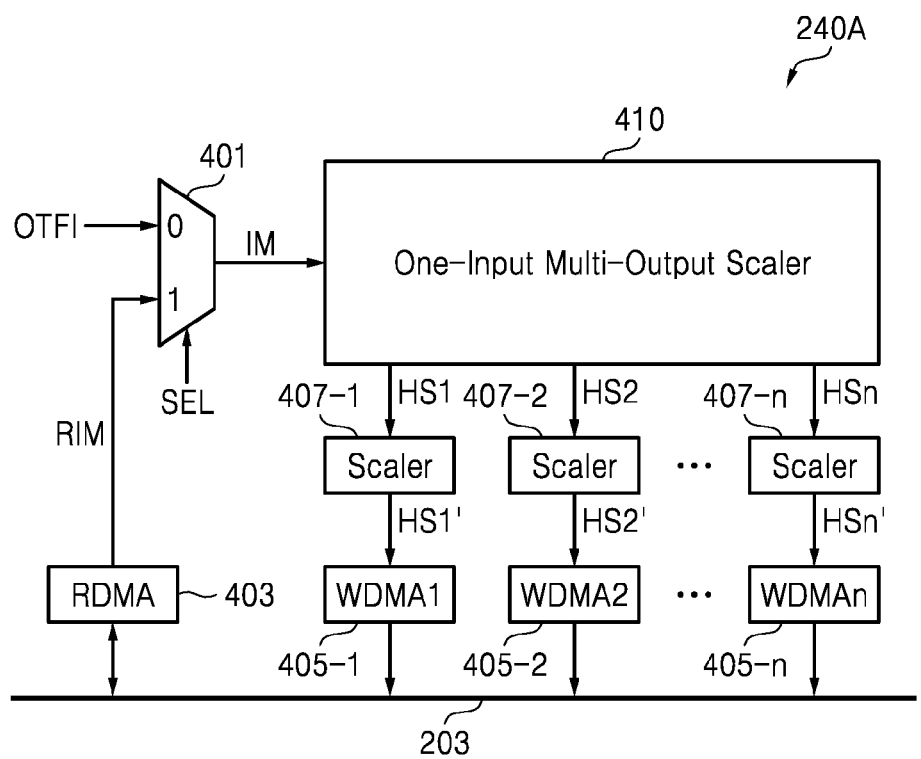
FIG. 9 is a block diagram which shows another exemplary embodiment of the scaler circuit shown in FIG. 1.

FIG. 9 is a block diagram which shows another exemplary embodiment of the scaler circuit shown in FIG. 1. Referring to FIG. 9, the scaler circuit 240A may include the selector 401, the read DMA controller 403, the plurality of write DMA controllers 405-1 to 405-n, the one-input multi-output scaler 410, and a plurality of post-scalers 407-1 to 407-n.

Each of the post-scalers 407-1 to 407-n may vertically and horizontally scale-down each of the scaled pixels HS1 to HSn output from the one-input multi-output scaler 410, and transmit the scaled-down pixels HS1' to HSn' to the plurality of DMA controllers 405-1 to 405-n. That is, each of the post-scalers 407-1 to 407-n may perform only the scale-down operation.

In order to embody a scaler circuit 240A having a high scale-down ratio in a small area, the scale-down operation can be performed in two steps. A first step of the two steps is performed by the one-input multi-output scaler 410, and a second step of the two steps is performed by the post-scalers 407-1 to 407-n. For example, when a scale-down ratio of the scaler circuit 240A may be ⅛, a scale-down ratio of the one-input multi-output scaler 410 may be ¼, and a scale-down ratio of each of the post-scalers 407-1 to 407-n may be ½.

A maximum input bandwidth of each of the post-scalers 407-1 to 407-n may be determined by a maximum input bandwidth of the one-input multi-output scaler 410 and a maximum scale-down ratio of the one-input multi-output scaler 410. For example, the maximum input bandwidth of each of the post-scalers 407-1 to 407-n may be determined by multiplying the maximum input bandwidth of the one-input multi-output scaler 410 and a maximum scale-down ratio of the one-input multi-output scaler 410.

An input image of the one-input multi-output scaler 410 needs to be the original image, and the line memory 430 needs to be shared, such that the post-scalers 407-1 to 407-n for post-scaling needs to be connected to an output terminal of the one-input multi-output scaler 410.

Figure 10:
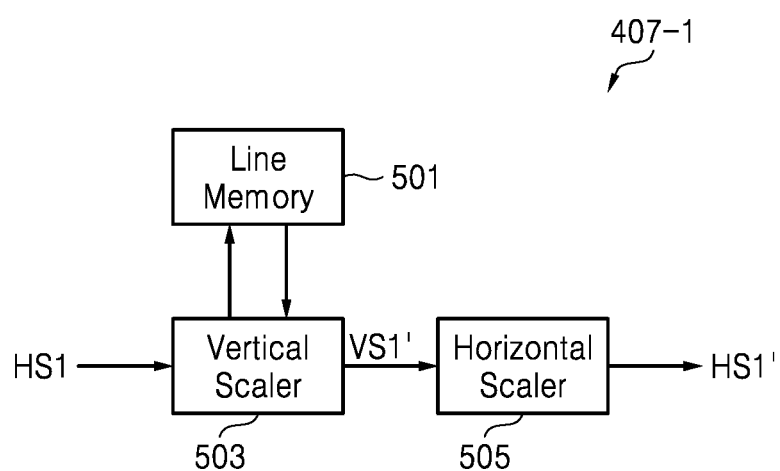
FIG. 10 is a block diagram of a post-scaler shown in FIG. 9.

FIG. 10 is a block diagram of a post-scaler shown in FIG. 9. Referring to FIG. 10, the plurality of post-scalers 407-1 to 407-n are substantially the same as or similar to each other in structure and operation, such that a structure and an operation of a first post-scaler 407-1 will be described.

The first post-scaler 407-1 may include a line memory 501, a vertical scaler 503, and a horizontal scaler 505.

The vertical scaler 503 may receive scaled pixels HS1 output from a first horizontal scaler 445-1 of the first scaler 440-1 of FIG. 3, and store the scaled pixels HS1 in the line memory 501. When the scaled pixels HS1 necessary for processing are stored in the line memory 501, the vertical scaler 503 may read the scaled pixels HS1 from the line memory 501, vertically scale-down the read scaled pixels HS1 according to a vertical scaling ratio, and output the vertically down-scaled pixels VS1' to the horizontal scaler 505.

The horizontal scaler 505 may horizontally scale-down the vertically scaled pixels VS1' according to a horizontal scaling ratio, and output the horizontally down-scaled pixels HS1' to a first write DMA controller 405. A scaling ratio of the first post-scaler 407-1 may be determined according to a vertical scaling ratio (e.g., a scale-down ratio) of the vertical scaler 503 and a horizontal scaling ratio (e.g., a scale-down ratio) of the horizontal scaler 505, which are included in the first post-scaler 407-1.

A scaling ratio of the second post-scaler 407-2 may be determined according to a vertical scaling ratio (e.g., a scale-down ratio) of a vertical scaler and a horizontal scaling ratio (e.g., a scale-down ratio) of a horizontal scaler, which are included in the second post-scaler 407-2.

A scaling ratio of a $n^{th}$ post-scaler 407-$n$ may be determined according to a vertical scaling ratio (e.g., a scale-down ratio) of a vertical scaler and a horizontal scaling ratio (e.g., a scale-down ratio) of a horizontal scaler, which are included in the $n^{th}$ post-scaler 407-$n$.

The scaling ratio of the first post-scaler 407-1, the scaling ratio of the second post-scaler 407-2, and the scaling ratio of the $n^{th}$ scaler 407-$n$ may be different from one another.

As shown in FIG. 3, each vertical scaler included in each of the post scalers 407-1 to 407-$n$ may include a storage device which stores a vertical scale-down ratio, and each horizontal scaler included in each of the post scalers 407-1 to 407-$n$ may include a storage device which stores a horizontal scale-down ratio. Moreover, the each vertical scaler and the each horizontal scaler may include a scaling controller which can control a scaling operation.

Figure 11:
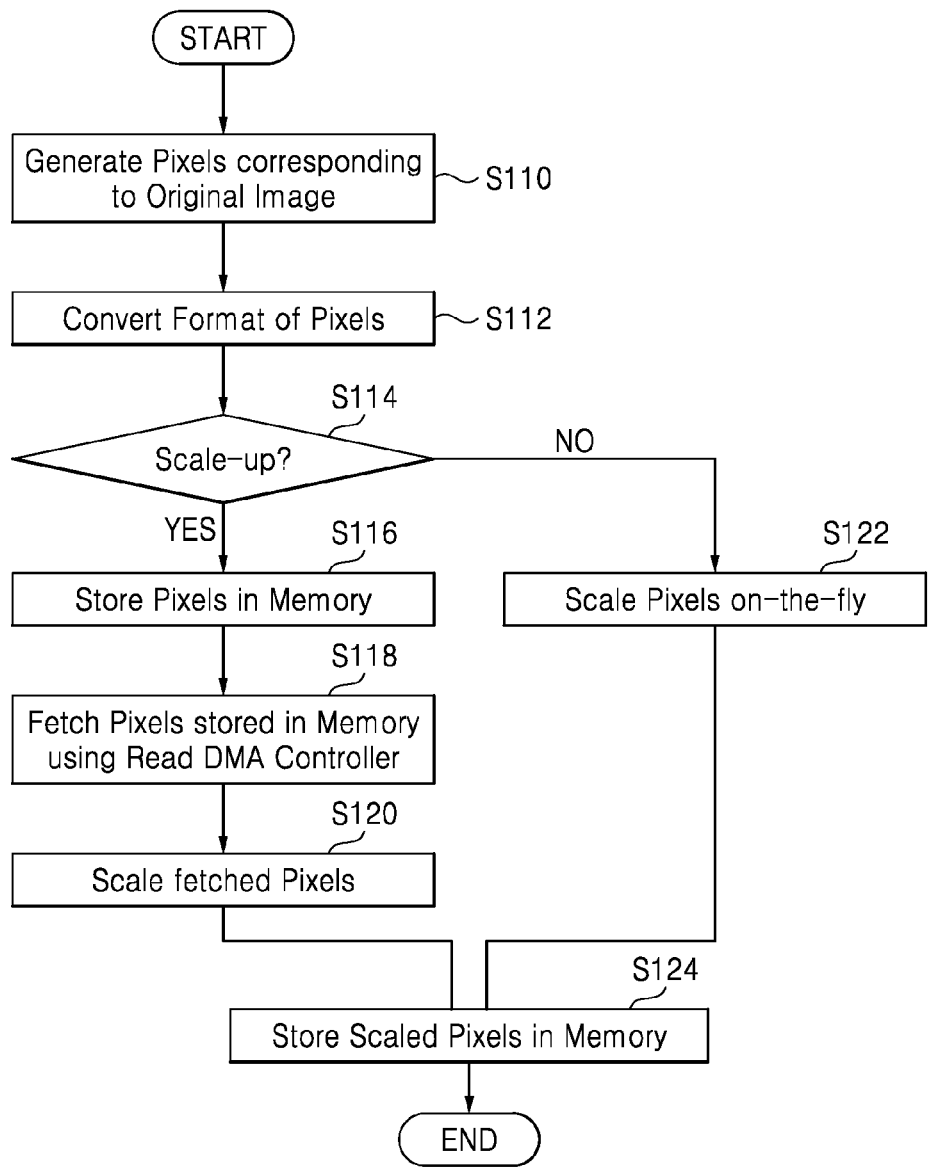
FIG. 11 is a flowchart which describes an operation of the data processing system shown in FIG. 1.

FIG. 11 is a flowchart which describes an operation of the data processing system shown in FIG. 1. Referring to FIGS. 1 to 11, an image sensor 300 may generate pixels corresponding to an original image (or original image data), and transmit the generated pixels to the interface 220 (operation S110). The image signal processor 230 may convert a format of pixels received through the interface 220 (operation S112).

When pixels included in at least one region included in the original image are scaled-up (YES of operation S114), the image signal processor 230 may store pixels RIM in a memory 310 through a second path PATH2 (operation S116). A read DMA controller 403 may read (or fetch) the pixels RIM stored in the memory 310 according to a control of the CPU 210, and transmit the read pixels RIM to the one-input multi-output scaler 410 through the selector 401 (operation S118).

Each of the scalers 440-1 to 440-$n$ included in the one-input multi-output scaler 410 may perform a scaling operation (e.g., scale-up operation) on pixels included in each region to be processed by each of the scalers 440-1 to 440-$n$ (operation S120). For example, when at least one of the scalers 440-1 to 440-$n$ performs a scale-up operation, operations S114 to S120 may be performed.

Pixels which are scaled-up by at least one of the scalers 440-1 to 440-$n$ may be stored in the memory 310 according to a control of at least one of the plurality of write DMA controllers 405-1 to 405-$n$ (operation S124).

When pixels corresponding to at least one region included in the original image are scaled-down (NO of operation S114), the image signal processor 230 may transmit pixels OTFI to the selector 401 through a first path PATH1. The selector 401 may transmit the input pixels OTFI to the one-input multi-output scaler 410 as output pixels IM.

The one-input multi-output scaler 410 may scale the pixels IM output from the selector 401 on-the-fly (operation S122). That is, each of the scalers 440-1 to 440-$n$ included in the one-input multi-output scaler 410 may perform a scaling operation (e.g., a scale-down operation) on pixels included in a region to be processed by each of the scalers 440-1 to 440-$n$ on-the-fly (operation S122).

The pixels scaled-down by at least one of the scalers 440-1 to 440-$n$ may be stored in the memory 310 according to a control of at least one of the plurality of write DMA controllers 405-1 to 405-$n$ (operation S124). For example, operations S114 to S124 may be processed in units of frames or frame data.

Figure 12:
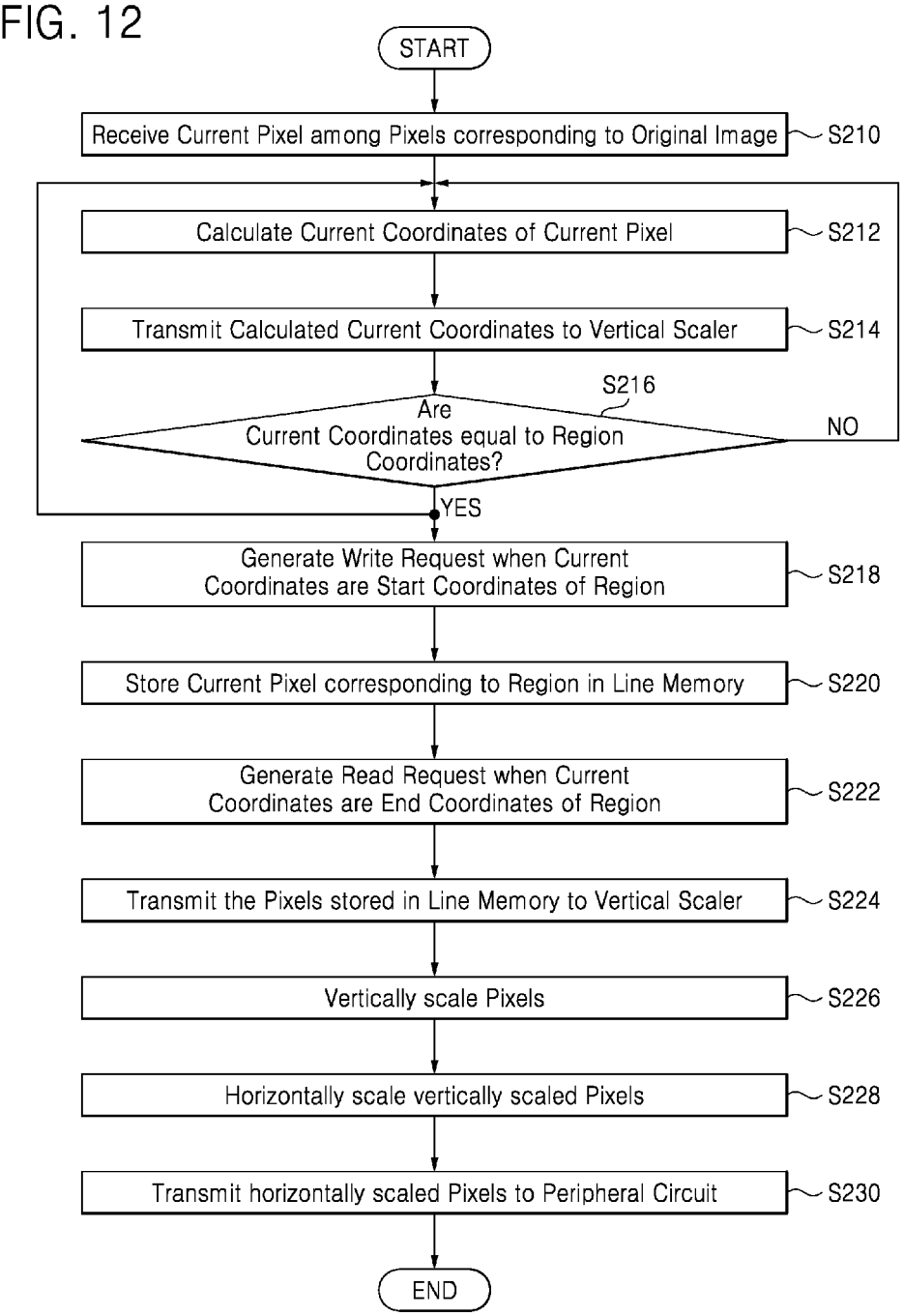
FIG. 12 is a flowchart which describes an operation of the scaler circuit shown in FIG. 2.

FIG. 12 is a flowchart which describes an operation of the scaler circuit shown in FIG. 2. Referring to FIGS. 1 to 12, the one-input multi-output scaler 410 may receive a current pixel among the pixels IM corresponding to an original image (or original image data) (operation S210). The pixels IM may be sequentially input in units of pixels through one of a plurality of paths PATH1 and PATH2. One pixel may be expressed in a plurality of bits.

The position information calculator 421 may calculate position information CPI, e.g., a current coordinates, of a current pixel (operation S212). The calculated position information CPI, e.g., the current coordinates, of a current pixel may be transmitted to each of the vertical scalers 441-1 to 441-$n$ of each of the scalers 440-1 to 440-$n$ (operation S214).

As described referring to FIGS. 6, 7A, 7B, and 7C, each of the vertical scalers 441-1 to 441-$n$ may determine whether or not the received current coordinates is the same as a start coordinates of each region (or a coordinates in each region) stored in each of the storage devices REG1-1 to REG1-$n$ (operation S216).

When a current coordinates is a start coordinates of a region (or a coordinates in a region) to be processed by at least one of the vertical scalers 441-1 to 441-$n$, at least one of the vertical scalers 441-1 to 441-$n$ may generate an activated write request signal (operation S218). For example, the position information calculator 421 may calculate a current coordinates input at each time point regardless of whether or not the current coordinates is a coordinates in a region to be processed by each of the vertical scalers 441-1 to 441-$n$ (operation S212).

The write control circuit 423 may write pixels input to the line memory controller 420 in the line memory 430 while the write request signal WR maintains a high level (operation S220). For example, the write control circuit 423 may write pixels included in the first region SC0 in the line memory 430, and write pixels included in the second region SC1 in the line memory 430.

According to an exemplary embodiment, when the current coordinates is an end coordinates of a region to be processed by at least one of the vertical scalers 441-1 to 441-$n$, at least one of the vertical scalers 441-1 to 441-$n$ may generate a read request signal (operation S222). According to another exemplary embodiment, as described referring to FIGS. 7A to 7C, after pixels to be processed, e.g., 4*6 pixels, are stored in the line memory 430, at least one of the vertical scalers 441-1 to 441-$n$ may generate an activated read request signal.

The read control circuit 425 may read pixels included in each of the regions SC0 and SC1 and stored in the line memory 430, and transmit the read pixels to each of the vertical scalers 441-1 to 441-$n$ (operation S224).

The first vertical scaler 441-1 which can scale the pixels included in the first region SC0 among the vertical scalers 441-1 to 441-$n$ may vertically scale the pixels according to a vertical scaling ratio of the first vertical scaler 441-1 (operation S226).

The second vertical scaler 441-2 which can scale the pixels included in the second region SC1 among the vertical scalers 441-1 to 441-$n$ may vertically scale the pixels according to a vertical scaling ratio of the second vertical scaler 441-2 (operation S226). The vertical scalers 441-1, 441-2, and 441-$n$ may perform a scaling operation at the same time or in a parallel manner.

The first horizontal scaler 445-1 may horizontally scale the pixels which are vertically scaled by the first vertical scaler 441-1 according to a horizontal scaling ratio of the first horizontal scaler 445-1 (operation S228). The second horizontal scaler 445-2 may horizontally scale the pixels vertically scaled by the second vertical scaler 441-2 according to a horizontal scaling ratio of the first horizontal scaler 445-2 (operation S228). A $n^{th}$ horizontal scaler 445-$n$ may horizontally scale the pixels vertically scaled by the second vertical scaler 441-2 according to a horizontal scaling ratio of a $n^{th}$ horizontal scaler 445-$n$ (operation S228).

A first write DMA controller 405-1 may output the scaled pixels HS1 output from the first horizontal scaler 445-1 to a peripheral circuit, e.g., a memory controller 250 and/or a display 330, through the bus architecture 203 (operation S230). A second write DMA controller 405-2 may output the scaled pixels HS2 output from the second horizontal scaler 445-2 to a peripheral circuit, e.g., the memory controller 250 and/or the display 330, through the bus architecture 203.

An $n^{th}$ write DMA controller 405-$n$ may output scaled pixels HSn output from the nth horizontal scaler 445-$n$ to a peripheral circuit, e.g., the memory controller 250 and/or the display 330, through the bus architecture 203 (operation S230).

While not restricted thereto, an exemplary embodiment can include one or more units embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. A scaler circuit according to an exemplary embodiment and devices having the same may generate images which have different scaling, images which have different resolution, or resized images from a single image in a parallel manner. Accordingly, power consumption of the scaler circuit and devices including the scaler can be decreased.

Although a few exemplary embodiments concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. A scaler circuit comprising:
a first scaler configured to perform a first horizontal scaling operation after a first vertical scaling operation;
a second scaler configured to perform a second horizontal scaling operation after a second vertical scaling operation; and
a line memory which is shared by the first scaler and the second scaler,
wherein each of the first scaler and the second scaler generates each of a first image and a second image, respectively, having different resolutions from a single image using the line memory.

2. The scaler circuit of claim 1, further comprising a line memory controller configured to transmit position information on each of pixels included in the single image to the first scaler and the second scaler.

3. The scaler circuit of claim 2, wherein the first scaler is configured to select first pixels related to the first image to be stored in the line memory among the pixels using the position information on each of the pixels, and
wherein the second scaler is configured to select second pixels related to the second image to be stored in the line memory among the pixels using the position information on each of the pixels.

4. The scaler circuit of claim 3, wherein the first scaler is configured to determine first read timings for the first pixels stored in the line memory using the position information on each of the pixels, and
wherein the second scaler is configured to determine second read timings for the second pixels stored in the line memory using the position information on each of the pixels.

5. The scaler circuit of claim 4, wherein the first scaler is configured to control the line memory controller to store the first pixels in the line memory and to read the first pixels stored in the line memory according to the first read timings, and
wherein the second scaler is configured to control the line memory controller to store the second pixels in the line memory and to read the second pixels stored in the line memory according to the second read timings.

6. The scaler circuit of claim 5, wherein the first scaler includes
a first vertical scaler configured to vertically scale the first pixels transmitted from the line memory controller; and
a first horizontal scaler configured to horizontally scale pixels output from the first vertical scaler to generate the first image,
wherein the second scaler includes
a second vertical scaler configured to vertically scale the second pixels transmitted from the line memory controller; and
a second horizontal scaler configured to horizontally scale pixels output from the second vertical scaler to generate the second image.

7. The scaler circuit of claim 1, further comprising:
a first post-scaler configured to scale down the first image generated by the first scaler; and
a second post-scaler configured to scale down the second image generated by the second scaler.

8. The scaler circuit of claim 1, further comprising a line memory controller configured to store first pixels related to the first image among the pixels in the line memory and read the first pixels stored in the line memory according to a control of the first scaler, and
to store second pixels related to the second image among the pixels in the line memory and read the second pixels stored in the line memory according to a control of the second scaler.

9. The scaler circuit of claim 8, wherein the first scaler includes
a first vertical scaler configured to vertically scale the first pixels transmitted from the line memory controller; and
a first horizontal scaler configured to horizontally scale pixels output from the first vertical scaler to generate the first image,
wherein the second scaler includes
a second vertical scaler configured to vertically scale the second pixels transmitted from the line memory controller; and
a second horizontal scaler configured to horizontally scale pixels output from the second vertical scaler to generate the second image.

10. The scaler circuit of claim 8, further comprising:
a FIFO controller;
a line buffer which is accessible by the FIFO controller or the line memory controller; and
a selector configured to provide an input image of the FIFO controller or an output image of the FIFO controller as the single image.

11. The scaler circuit of claim 10, wherein, when the first image and the second image are images scaled-up and the single image is the output image of the FIFO controller, each of the first scaler and the second scaler generates the first image and the second image using the line memory, respectively, and
when the first image and the second image are scaled-up images and the single image is the input image of the FIFO controller, each of the first scaler and the second scaler generates the first image and the second image, respectively, using the line memory and the line buffer.

12. An application processor comprising:
a bus; and
a scaler circuit which is connected to the bus,
wherein the scaler circuit includes
a first scaler configured to perform a first horizontal scaling operation after a first vertical scaling operation,
a second scaler configured to performs a second horizontal scaling operation after a second vertical scaling operation, and
a line memory which is shared by the first scaler and the second scaler,
wherein each of the first scaler and the second scaler generates a first image and a second image, respectively, having different resolutions from a single image, respectively, using the line memory.

13. The application processor of claim 12, further comprising a line memory controller configured to transmit position information on each of pixels included in the single image to the first scaler and the second scaler,
wherein the first scaler is configured to select first pixels related to the first image to be stored in the line memory among the pixels using the position information on each of the pixels, and
the second scaler is configured to select second pixels related to the second image to be stored in the line memory among the pixels using the position information on each of the pixels.

14. The application processor of claim 13, wherein the first scaler is configured to determine first read timings for the first pixels stored in the line memory using the position information on each of the pixels,
wherein the second scaler is configured to determine second read timings for the second pixels stored in the line memory using the position information on each of the pixels,
wherein the first scaler is configured to control the line memory controller to store the first pixels in the line memory and to read the first pixels stored in the line memory according to the first read timings, and
wherein the second scaler is configured to control the line memory controller to store the second pixels in the line memory and to read the second pixels stored in the line memory according to the second read timings.

15. The application processor of claim 14, wherein the first scaler includes
a first vertical scaler configured to vertically scale the first pixels transmitted from the line memory controller; and
a first horizontal scaler configured to horizontally scale pixels output from the first vertical scaler to generate the first image,
the second scaler includes
a second vertical scaler configured to vertically scale the second pixels transmitted from the line memory controller; and
a second horizontal scaler configured to horizontally scale pixels output from the second vertical scaler to generate the second image.

16. The application processor of claim 12, further comprising a line memory controller configured to store first pixels related to the first image among the pixels in the line memory and read the first pixels stored in the line memory according to a control of the first scaler, and to store second pixels related to the second image among the pixels in the line memory and read the second pixels stored in the line memory according to a control of the second scaler.

17. A mobile computing device comprising:
an image sensor;
an external memory; and
an application processor which is connected to the image sensor and the external memory,
wherein the application processor includes
a bus; and
a scaler circuit which is connected to the bus,
wherein the scaler circuit includes
a first scaler configured to perform a first horizontal scaling operation after a first vertical scaling operation;
a second scaler configured to performs a second horizontal scaling operation after a second vertical scaling operation; and
a line memory which is shared by the first scaler and the second scaler,
wherein each of the first scaler and the second scaler generates a first image and a second image, respectively, having different resolutions from a single image, respectively, using the line memory.

18. The mobile computing device of claim 17, further comprising a line memory controller configured to transmit position information on each of pixels included in the single image to the first scaler and the second scaler,
the first scaler is configured to select first pixels related to the first image to be stored in the line memory among the pixels using the position information on each of the pixels, and
the second scaler is configured to select second pixels related to the second image to be stored in the line memory among the pixels using the position information on each of the pixels.

19. The mobile computing device of claim 17, further comprising a line memory controller configured to store first pixels related to the first image among the pixels in the line memory and read the first pixels stored in the line memory according to a control of the first scaler, and to store second pixels related to the second image among the pixels in the line memory and read the second pixels stored in the line memory, according to a control of the second scaler.

20. The mobile computing device of claim 19, wherein the first scaler includes
a first vertical scaler configured to vertically scale the first pixels transmitted from the line memory controller; and
a first horizontal scaler configured to horizontally scale pixels output from the first vertical scaler to generate the first image, wherein the second scaler includes
a second vertical scaler configured to vertically scale the second pixels transmitted from the line memory controller; and
a second horizontal scaler configured to horizontally scale pixels output from the second vertical scaler to generate the second image.

\* \* \* \* \*